(12) United States Patent
Best

(10) Patent No.: US 7,326,117 B1
(45) Date of Patent: Feb. 5, 2008

(54) NETWORKED VIDEO GAME SYSTEMS

(76) Inventor: Robert M. Best, 5100 S. Cleveland Ave. Bldg. 318-325, Fort Myers, FL (US) 33907

(*) Notice: Subject to any disclaimer, the term of this patent is extended or adjusted under 35 U.S.C. 154(b) by 945 days.

(21) Appl. No.: 10/668,940

(22) Filed: Sep. 22, 2003

Related U.S. Application Data

(63) Continuation-in-part of application No. 09/928,294, filed on Aug. 10, 2001, which is a continuation-in-part of application No. 09/853,487, filed on May 10, 2001, now Pat. No. 6,966,837.

(51) Int. Cl.
  *A63F 13/00* (2006.01)
(52) U.S. Cl. .............. 463/32; 463/33; 463/42
(58) Field of Classification Search ........... 463/31–33, 463/40, 42
See application file for complete search history.

(56) References Cited

U.S. PATENT DOCUMENTS

| | | |
|---|---|---|
| 5,224,166 A | 6/1993 | Hartman |
| 5,577,960 A * | 11/1996 | Sasaki ............ 463/32 |
| 6,267,673 B1 | 7/2001 | Miyamoto et al. |
| 6,437,777 B1 | 8/2002 | Kamachi et al. |
| 6,449,344 B1 | 9/2002 | Goldfinger et al. |
| 6,468,160 B2 | 10/2002 | Eliott |
| 6,500,070 B1 | 12/2002 | Tomizawa |
| 6,539,421 B1 | 3/2003 | Appelman et al. |
| 6,561,909 B1 | 5/2003 | Iizuka et al. |
| 6,570,563 B1 | 5/2003 | Honda |
| 6,579,184 B1 | 6/2003 | Tanskanen |
| 6,712,703 B2 | 3/2004 | Miyamoto et al. |
| 2001/0029205 A1 | 10/2001 | Taho et al. |
| 2003/0153373 A1 | 8/2003 | Squibbs |

OTHER PUBLICATIONS

'Getting Started: Setting Up Your Network'. Warp Pipe Technologies, [online]. 2003 [retrieved on Oct. 15, 2005] 3 pages. Retrieved from the Internet: <URL: http://cubeonline.warppipe.com/gettingstarted/network_setup.html>.
'Wireless Bridge'. Warp Pipe Technologies, [online]. 2003 [retrieved on Oct. 15, 2005] 2 pages. Retrieved from the Internet: <URL: http://cubeonline.warppipe.com/gettingstarted/wireless.html>.

* cited by examiner

*Primary Examiner*—Xuan M. Thai
*Assistant Examiner*—Robert Mosser
(74) *Attorney, Agent, or Firm*—Graybeal Jackson Haley LLP

(57) ABSTRACT

Video game systems for multiple-player games may exchange synchronizing data through the Internet or other data transmission link. These hidden status data records keep the video game systems synchronized with each other whenever different players are making use of a virtual game doorway or other shared passageway.

15 Claims, 25 Drawing Sheets

Fig. 13

| record format | time stamp | message serial number | session and game id | player id number | object id | X, Y, Z location coordinates | X, Y, Z velocity vector | movement |

| record format | time stamp | message serial number | session and game id | player id number | object id | ψ heading angle | rate of rotation | orientation |

| record format | time stamp | message serial number | session and game id | player id number | object id | θ pitch angle | φ roll angle | orientation |

| record format | time stamp | message serial number | session and game id | player id number | object id | object id | collision |

| record format | time stamp | message serial number | session and game id | player id number | object id | character swimming / character flying / character jumping |

| record format | time stamp | message serial number | session and game id | player id number | object id | attribute | value | current strength |

| record format | time stamp | message serial number | session and game id | player id number | object id | door id | go through door |

Fig. 14

| record format | time stamp | message serial number | session and game id | player id number | Internet Protocol address |
|---|---|---|---|---|---|

78 points to the "player id number" column.

| record format | time stamp | message serial number | session and game id | player id number | name of game player |
|---|---|---|---|---|---|

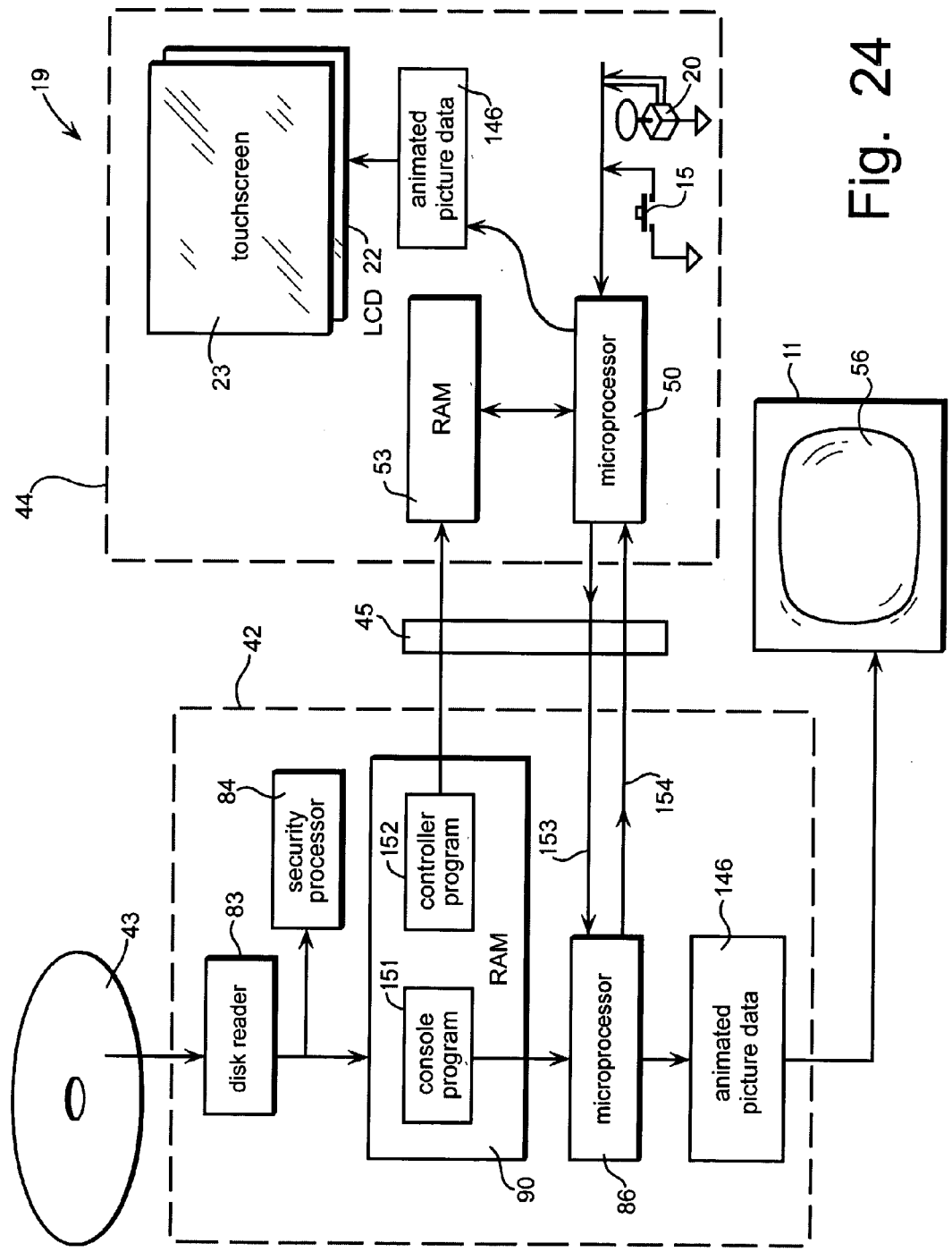

NETWORKED VIDEO GAME SYSTEMS

CROSS-REFERENCES TO RELATED APPLICATIONS

This is a continuation in part of application Ser. No. 09/928,294 filed Aug. 10, 2001, which is a continuation in part of application Ser. No. 09/853,487 filed May 10, 2001 now U.S. Pat. No. 6,966,837, the entire content of which is hereby incorporated by reference herein.

FIELD OF THE INVENTION

This invention relates generally to electronic game systems and more particularly to networked multiple-player role playing games.

BACKGROUND OF THE INVENTION

Networked video games are an established art as represented by USPTO patent Class/Subclass 463-41, for example U.S. Pat. No. 6,579,184 (Tanskanen). It is known for networked client terminals to exchange status messages indicating object movement as described in U.S. Pat. Nos. 6,437,777 (Kamachi et al.) and 6,570,563 (Honda). It is also known for personal computers to exchange messages through an Internet server providing Instant Messaging (IM) as described in U.S. Pat. No. 6,539,421 (Appelman). It is also known for maps and other graphics to be displayed on an LCD in a portable game system linked to a video game console as described in U.S. Pat. No. 6,500,070 (Tomizawa).

SUMMARY OF THE INVENTION

It is a primary objective of the present invention to provide multi-player games for players who operate separate video game systems that communicate over a network. In the preferred embodiment, networked video game consoles read data from software disks (with same title) and generate the same or related simulated 3D game worlds on different TV screens. Each player's friend uses a similar disk and may be miles away or next door. Using conventional control units, each player moves his player character in different parts of the simulated 3D world. Each console generates status data records providing information on the status of each game. These status records are transmitted to a common messaging server that transmits a copy of each data record to other client game systems for each small group of friends who agree in advance to play one common multi-player video game on their respective systems. As the game progresses, each player controls his own first player character, but is also made aware of what other player characters are doing, even if the other player characters are not close enough in the simulated game world to be visible on a TV screen view of the first player character.

Each game system receives frequent status data records from other game systems through the common messaging server and uses the status data to update variables for each character such as the location of the character in the simulated 3D world, the direction and velocity of movement of each character, the orientation of each character, collisions of characters and other objects, acquisitions of weapons, tools, etc. and which ones were acquired by each character, and energy and emotional attributes of player characters and non-player characters including player characters controlled by other players on the network. Status of objects and terrain in the simulated game world are also shared between game systems, such as guns fired, points scored, portals entered, locked/unlocked doors and other obstacles and events encountered, fuel in a fuel tank, location of resources, etc.

Each player may view any of the other player characters and objects from any point of view in the simulated world. A player does not have to search for other characters, unless that is part of the game, because each game system provides an automatic display of the other characters on an LCD screen in a portable game system linked to a player's video game console. Each players can explore, discover, and view other parts of the game world and send the coordinates of discovered objects to other players in the network so that they can view and use the discovered objects. For example one player may discover a simulated storehouse of tools or materials that other players need.

There is no need for detailed pictures to be transmitted to other game systems because each game system uses software disks that provide the same programs to each game system which can automatically regenerate pictures of any selected character and other objects in the simulated game worlds with the same location, direction of movement, orientation, and other variables in the other game systems based on the status data in the transmitted status records.

ADVANTAGES

By using pre-existing instant messaging services or the telephone system to distribute frequent game status data among thousands of small groups of video game systems, video game companies need not set up their own expensive networks of game servers and Internet service providers. An added benefit is that thousands of small groups of game players can use the same messaging service to contact other players who are interested in playing a specific game title and agree on a time to begin playing. The same messaging service would then transmit hidden status messages to the game systems operated by those same players.

BRIEF DESCRIPTION OF THE DRAWINGS

FIG. 13 are typical record formats of status records that may be transmitted to and received from an instant messaging server or direct through the Internet.

FIG. 14 are typical record formats of initializing records that may be transmitted to and received from an instant messaging server or direct through the Internet.

FIG. 24 is a block diagram illustrating downloading of game programs from a video game system to a portable game system.

DETAILED DESCRIPTION OF EXEMPLARY EMBODIMENT

Figure 1:
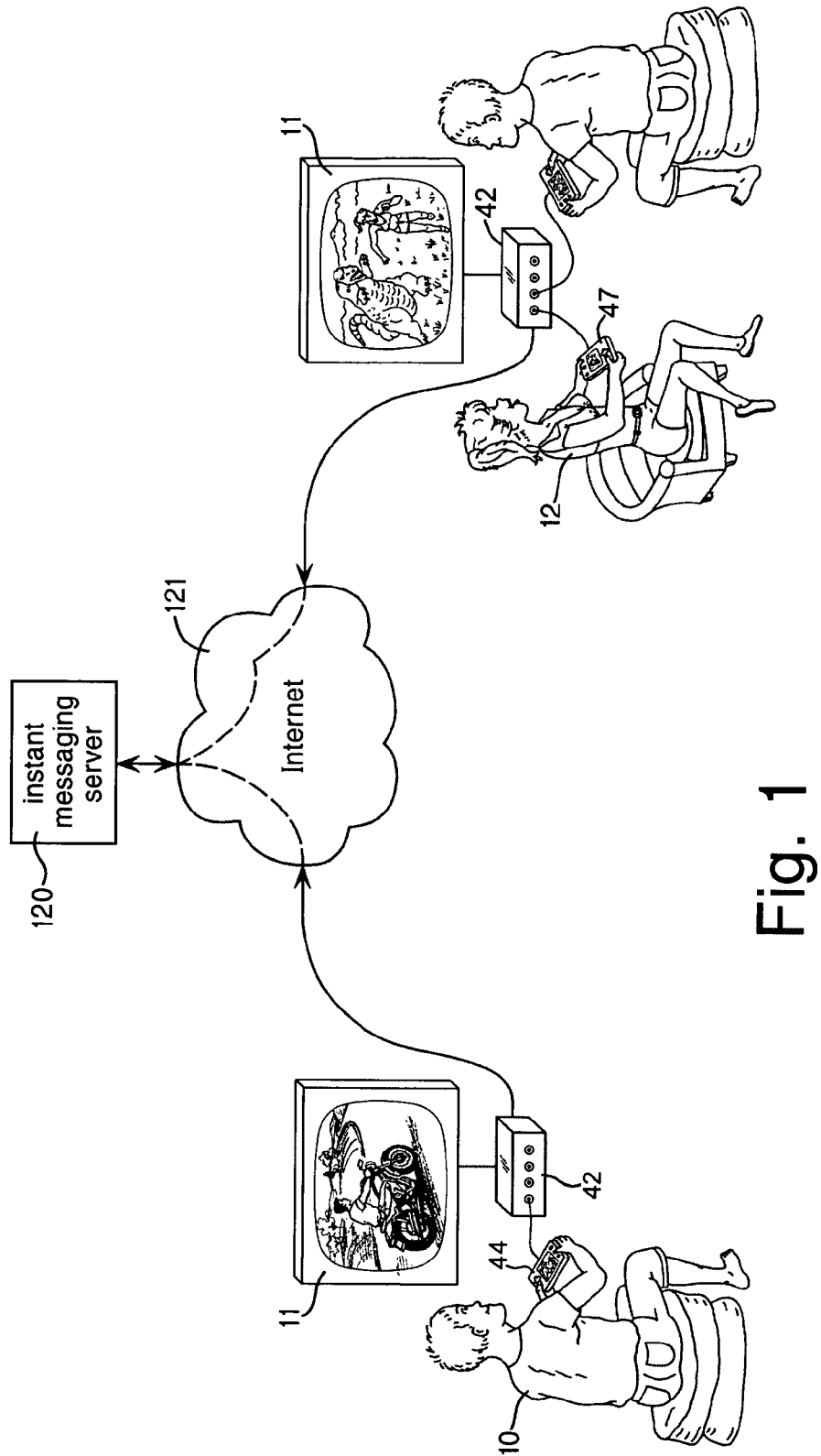
FIG. 1 is a perspective view of three human game players operating two video game consoles that are connected through the Internet to an instant messaging server.

FIG. 1 illustrates a preferred embodiment of a multi-player game system that has at least two video game consoles 42 sending video signals to corresponding television devices 11 for display as motion pictures. Each video game system 42 is manually controlled by at least one portable game system 44 and 47 being operated as a controller or controllers, in this example. Each game player 10 and 12 controls a different player character in the same multi-player game, typically a role playing game (RPG) shared by a small group of friends.

All of the video game systems 42 used by each group of friends execute the same game software during a game session, in this example. The same group of friends may use other game titles during different sessions. Other groups of friends may be using different game software titles simultaneously in separate sessions.

Each of the video game systems 42 transmit status data records 78 (see FIG. 13) through the Internet or other communications network 121 to a messaging server 120 which forwards the status data records 78 to other video game systems 42 in each session.

Messaging server 120 operates like a prior-art instant messaging server that shares each natural language message with several friends in each "buddy list" as described in U.S. Pat. No. 6,539,421, except that in the FIG. 13 examples, status data records 78 contain mostly digital codes and numbers that need not be readable by game players and hence would typically not be displayed as instant messages. Status data records 78 are sent to the other video game systems 42 to be processed in each session to keep the systems synchronized so that each video game system 42 can display any character or object in a simulated game world from variable points of view at any time during each session.

Each player's television 11 displays his/her player character as usual, but other characters, objects, maps, scores, etc. are displayed on a portable game system 44, 47, in this example.

Figure 2:
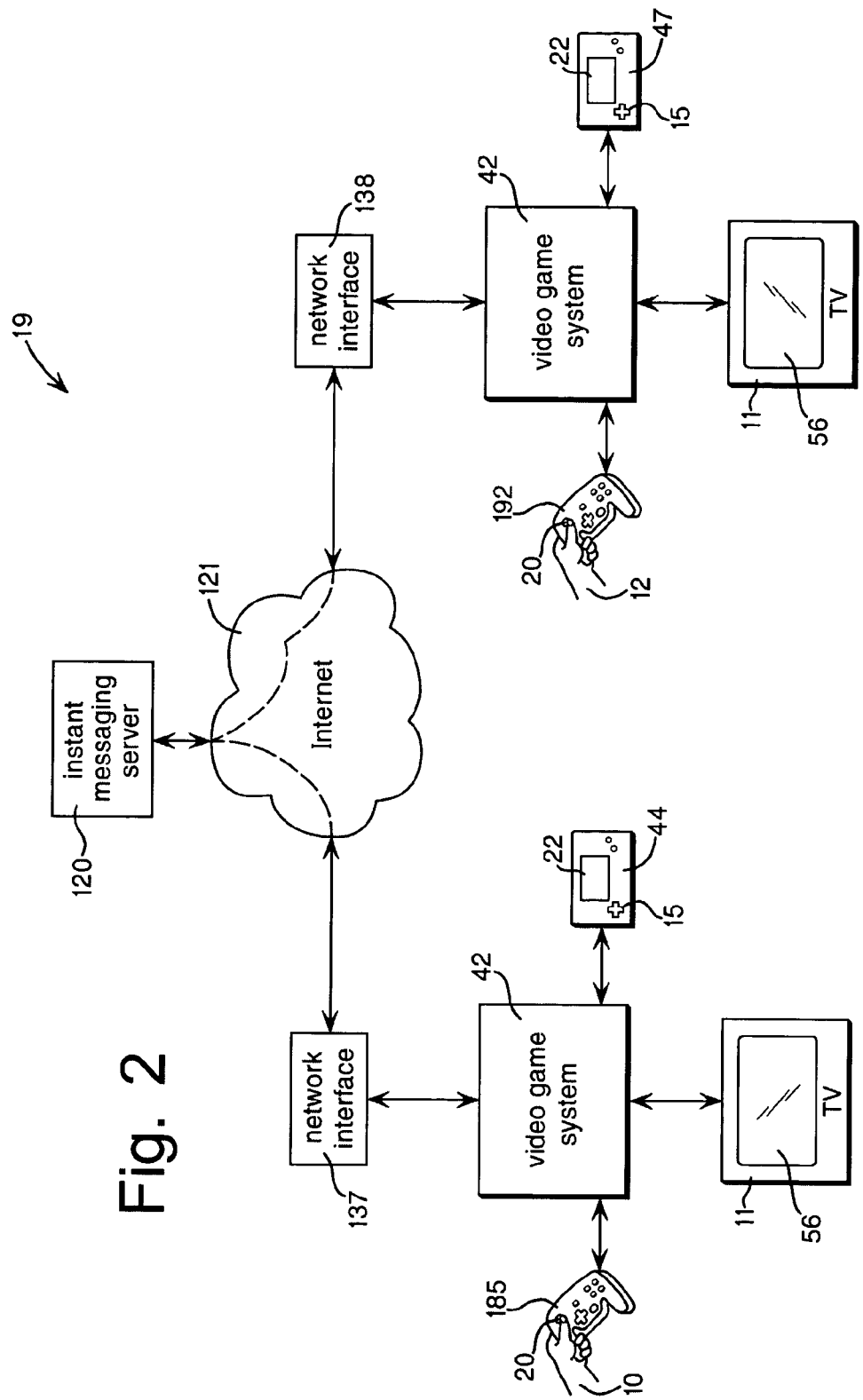
FIG. 2 is a block diagram of an embodiment in which two video game consoles are connected through the Internet to an instant messaging server.

FIG. 2 illustrates an embodiment similar to the example shown in FIG. 1 and has additional manually operated handheld controllers 185 and 192 that can control corresponding video game systems 42 using control members 20 such as joystick, button switches, direction switches, and touch pads.

Each video game system in this example has a network interface 137 & 138 which may provide IP numbers and broadband access or a modem and a tone generator for dialing telephone numbers to access messaging server 120, typically through an Internet Service Provider (ISP).

Each status data record 78 sent to the other video game systems 42 in a session may pass through messaging server 120. Alternatively, messaging server 120 may determine the current network (IP) address of each video game system 42 when systems 42 are connected to server 120 and then transmit a set of IP address records (see FIG. 23) to each system 42 in a session. Then each system 42 may send and receive status data records 78 as packets through the Internet or other network using data transmission protocols such as TCP/IP, so that most of the data records 78 need not pass through server 120.

Figure 3:
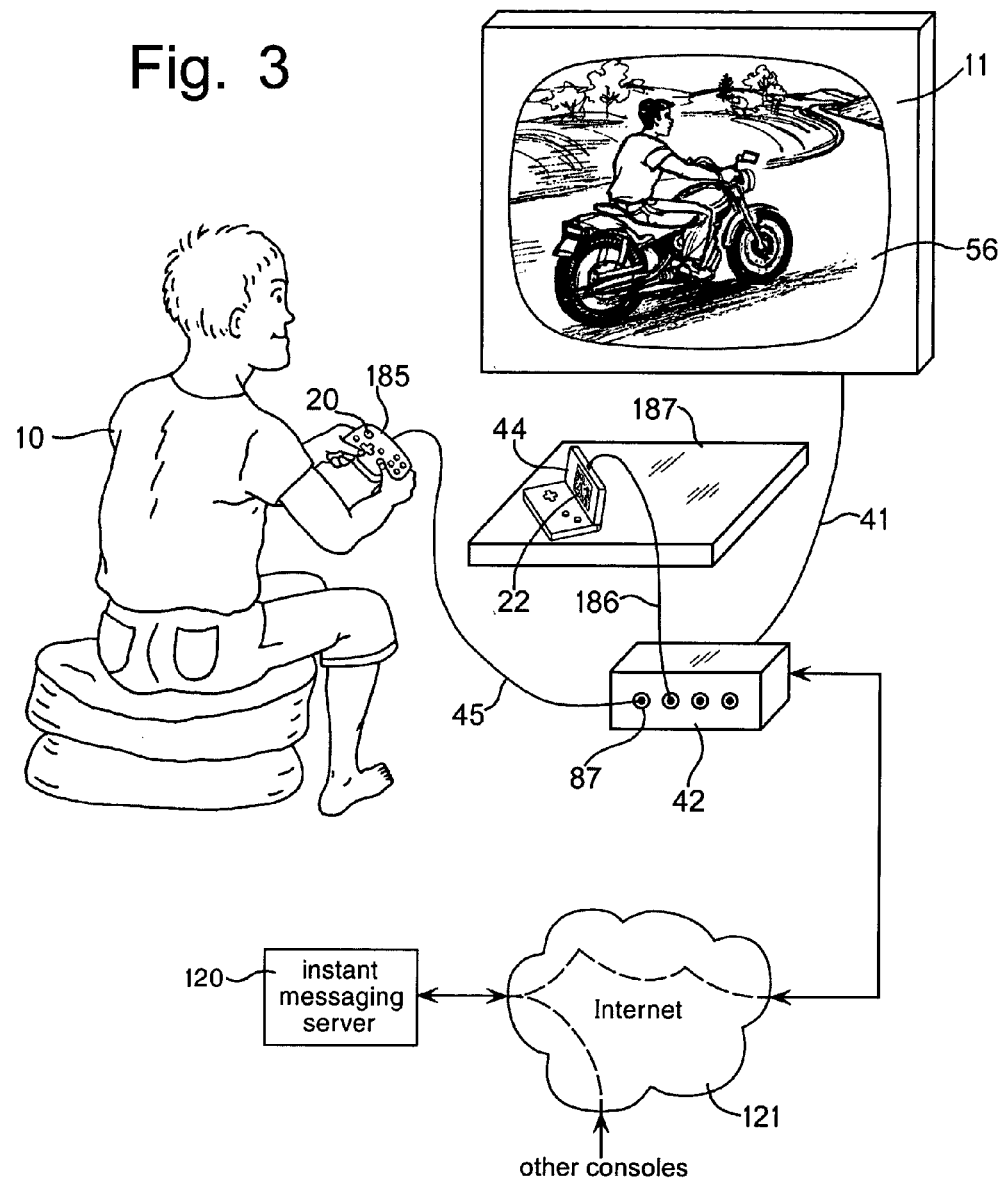
FIG. 3 is a perspective view of a game player controlling one video game console connected through the Internet to the console shown in FIG. 4.

FIG. 3 illustrates part of a two-player network game system that is similar to that described above with reference to FIG. 2, except that in this FIG. 3 example, portable game system 44 is operated as an auxiliary display. Portable game system 44 is shown resting on table 187 and is linked to video game system 42 by cable 186 or wireless equivalent. Video game system 42 processes incoming status data records 13 and generates therefrom synchronizing data for transmission to portable game system 44 which causes processor 50 and coprocessor 301 (see FIG. 18) to generates image data representing motion pictures of variable 3D views of the simulated 3D game world(s). Video game system 42 may also transmit data to portable game system 44 for display as still pictures, maps, text, and other images on LCD screens 22.

Image data representing motion pictures of variable 3D views of the simulated 3D game world(s) may be generated as rendered polygons in both video game system 42 and in each portable game system 44 and 47 so that characters and other objects in the image data can be viewed from variable and rapidly changing points of view and angles selected by players. One player in a multi-player session may select a point of view that is different from the point of view selected by another player viewing the same character or object for display on two different LCD 22 screens on two different portable game systems 44 and 47 connected to two different video game systems 42. If by chance, both players select substantially the same point of view for viewing the same character, both LCD 22 screens will show substantially the same image at substantially the same time, even though no image or picture data was transmitted between the two systems. The images will be the same because the spatial coordinates and orientation of the characters are the same as a result of the synchronizing status data (FIG. 13) shared among all systems in a session.

Image data representing variable 3D views of the simulated 3D game world(s) generated by different video game system processors 86 and image co-processors 316 (FIG. 18) in multiple video game systems 42 for display on respective television screens 11, will typically not show the same view because each player will control a different player character and the television screen will usually display a different player character. However, if two player characters are controlled to move to a spatial location that is close to each other and both players by chance choose substantially the same point of view to view their respective characters, then the corresponding television screens 56 will show substantially the same scene that has both player characters at the same time.

CPU processor 86 and image co-processor 316 in each video game system 42 generate rendered polygons so that characters and other objects in the image data can be viewed on television screen 56 from variable and rapidly changing angles selected by players.

Manually operated handheld controller 185 generates control data in response to manipulation of control member 20 and other control members to controls video game system 42. Additional control data may be generated in portable game system 44 by manipulation of directional switch 15. By pressing a button switch 14 or direction switch 15 or joystick 20 (see FIG. 18) on portable game system 44, a player can command system 42 to temporarily transfer control data from controller 185 through link 186 to portable system 44 to control images on LCD 22.

Alternatively, player 10 could retain control of his player character using controller 185 and use control members on portable system 44 to select points of view and locations for display on LCD 22. Since this would be difficult for players with only two hands, this alternative is most suitable for multi-player games that accept control data from two players controlling the same video game system 42 as described below with reference to FIG. 7.

Figure 4:
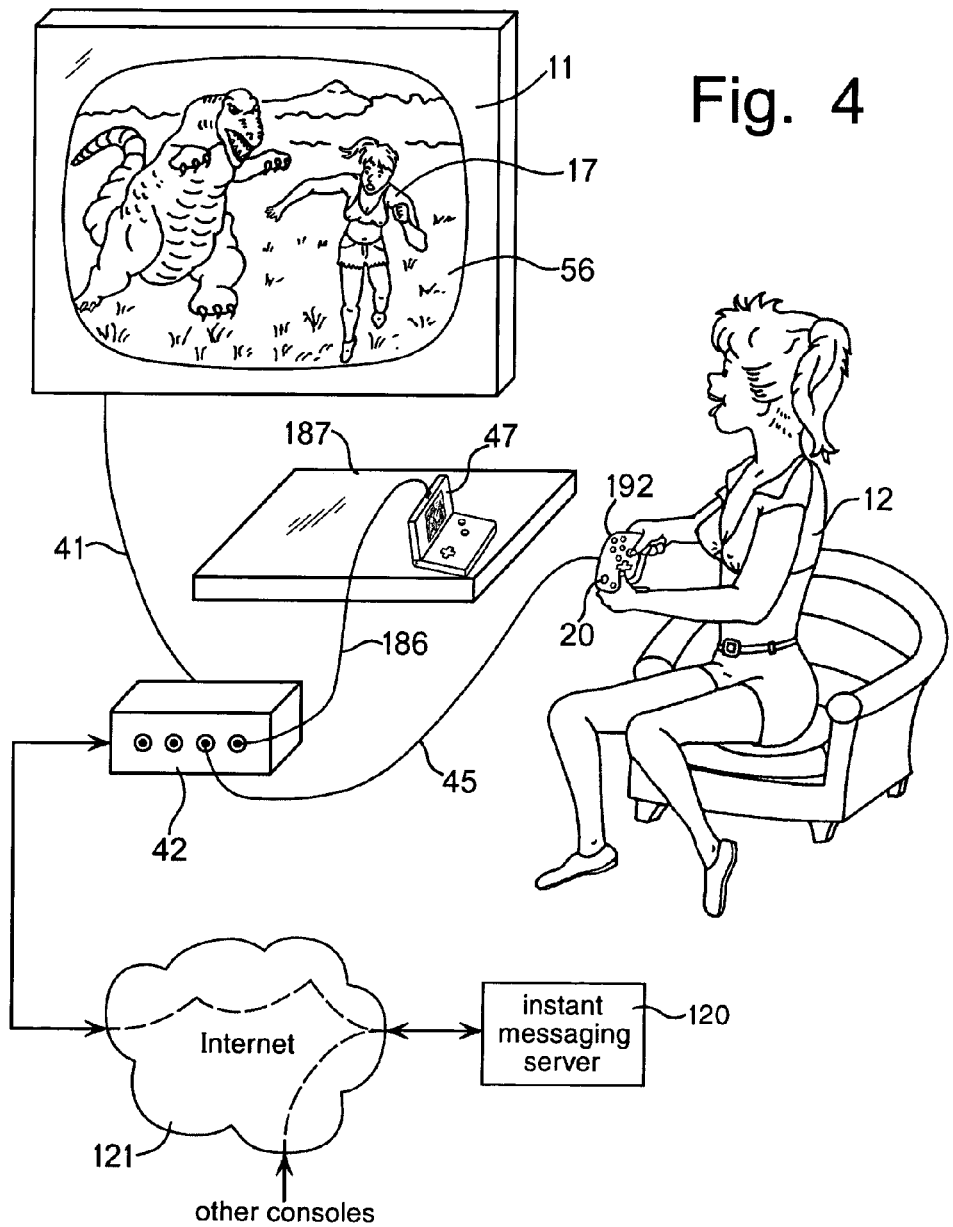
FIG. 4 is a perspective view of a game player controlling one video game console connected through the Internet to the console shown in FIG. 3.

In FIG. 4, which is another part of the networked game described above with reference to FIG. 3, portable game system 47 is operated as an auxiliary display. Portable game system 47 is shown resting on table 187 and is linked to video game system 42 by cable 186 or wireless equivalent. Player 12, using controller 192, controls her player character 17 who is about to be eaten by a dinosaur, in this example, unless another player character, such as the man on the motorcycle controlled by player 10 in FIG. 3 can rescue character 17. Player 10 in FIG. 3 is watching the same scene on his portable system LCD 22 that player 12 sees on television screen 56 in FIG. 4, typically from different points of view selected by the different players 10 and 12.

Figure 5:
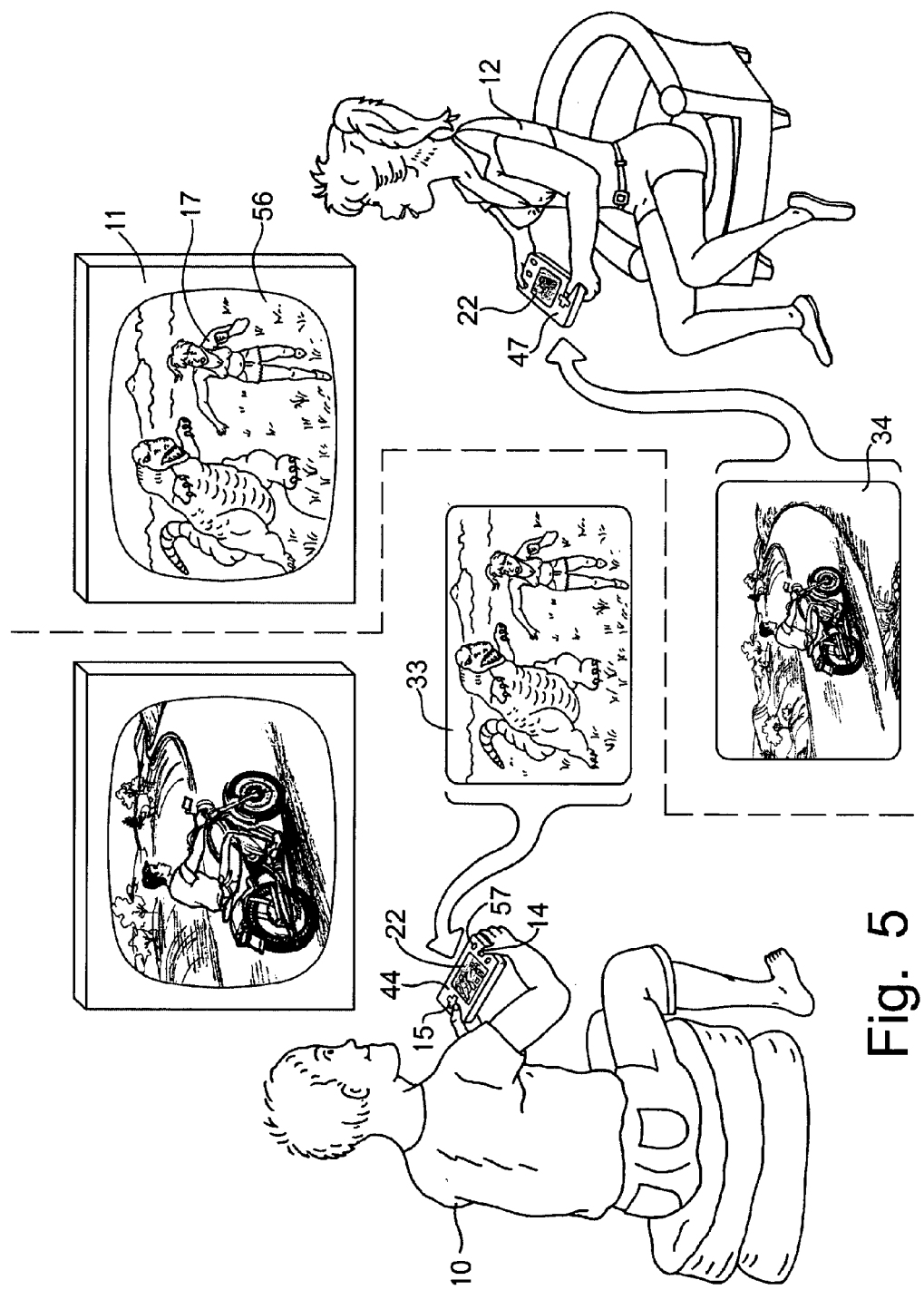
FIG. 5 is a perspective view of two game players who view both their own player characters and their friend's player characters on different display devices.

In FIG. 5, players 10 and 12 can see each other's player characters on their respective portable game systems 44 and 47. For clarity only one controller is shown for each player in FIG. 5, but the embodiment described above with reference to FIGS. 3 and 4 is preferred. In FIG. 5 player 10 sees and controls his player character on the motorcycle on his television screen and also sees the dinosaur scene 33 on his portable game system 44 LCD 22. Likewise player 12 sees and controls her player character 17 on television screen 56 and also sees the motorcycle scene 34 on her portable game system 47 LCD 22.

The line of dashes down the middle of FIG. 5 is to emphasize that the game being played to the left of the dash line is distant from the game being played to the right of the dash line, as illustrated more clearly in FIG. 1.

By pressing a button on her portable game system 47 in FIG. 5 (or controller 192 in FIG. 4) player 12 may view on her system 47 LCD 22 the same scene 33 that player 10 is watching. This may reassure player 12 that player 10 is aware of the danger to character 17. This can be accomplished if the 3D point of view coordinates and 3D viewing angle for each player's LCD 22 display are transmitted to the video game systems 42 of other players in each session in status data records (not shown in FIG. 13).

Figure 6:
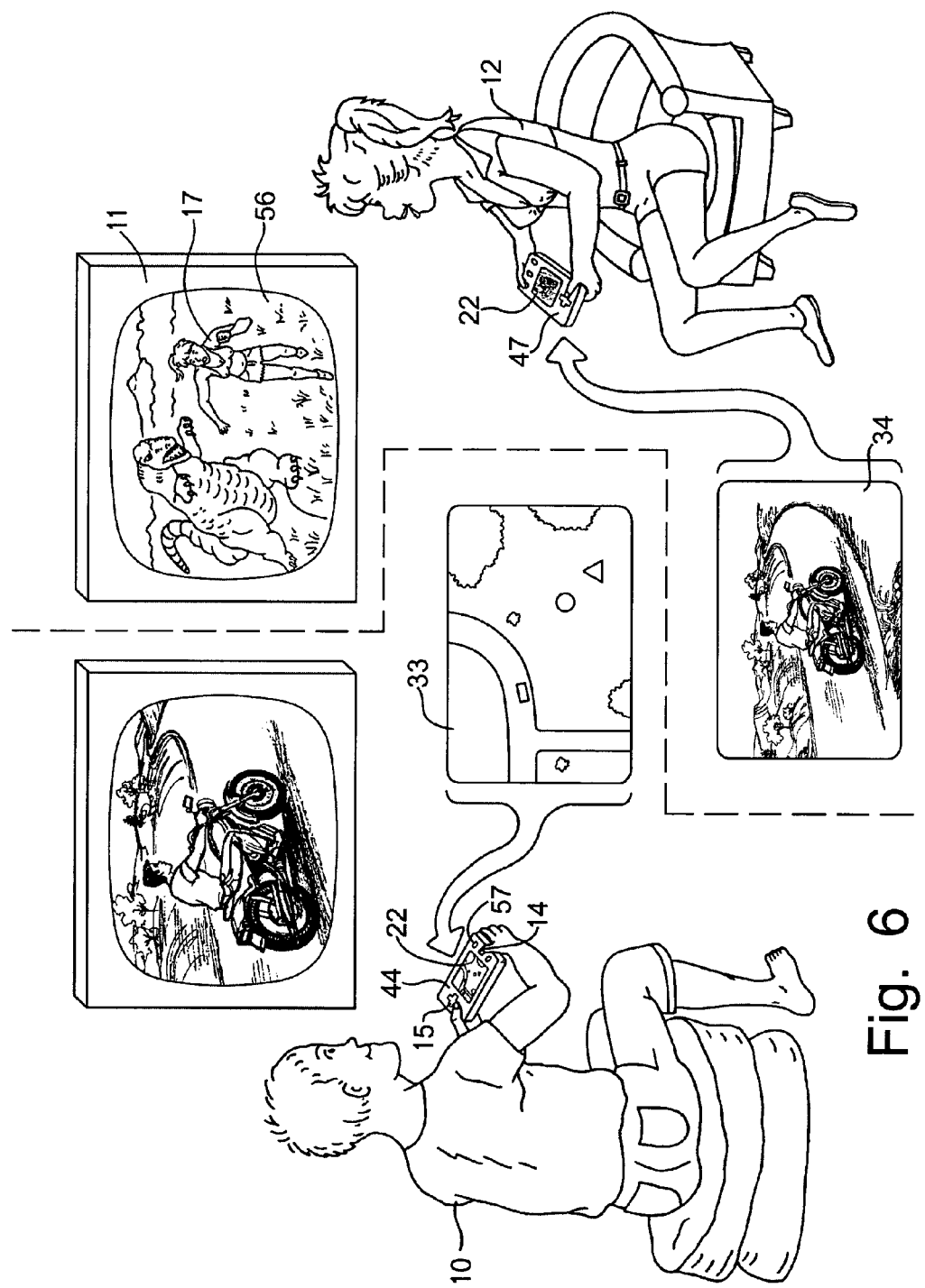
FIG. 6 is a perspective view of two game players who view their own player characters on TV screens while a map shows both player characters as symbols.

FIG. 6 illustrates a map 33 being displayed on portable game system 44 LCD 22 that shows with geometric symbols an overview that covers both the motorcycle scene 34 and the dinosaur scene in map form. In this example, the rectangle in map 33 is the motorcycle and rider, the circle represents the dinosaur and the triangle represents character 17. All players in a session can display map 33 because the video game systems 42 in each session store data representing the same 3D world from which a map can be constructed or updated by processor 50 in portable game systems 44 and 47.

Figure 7:
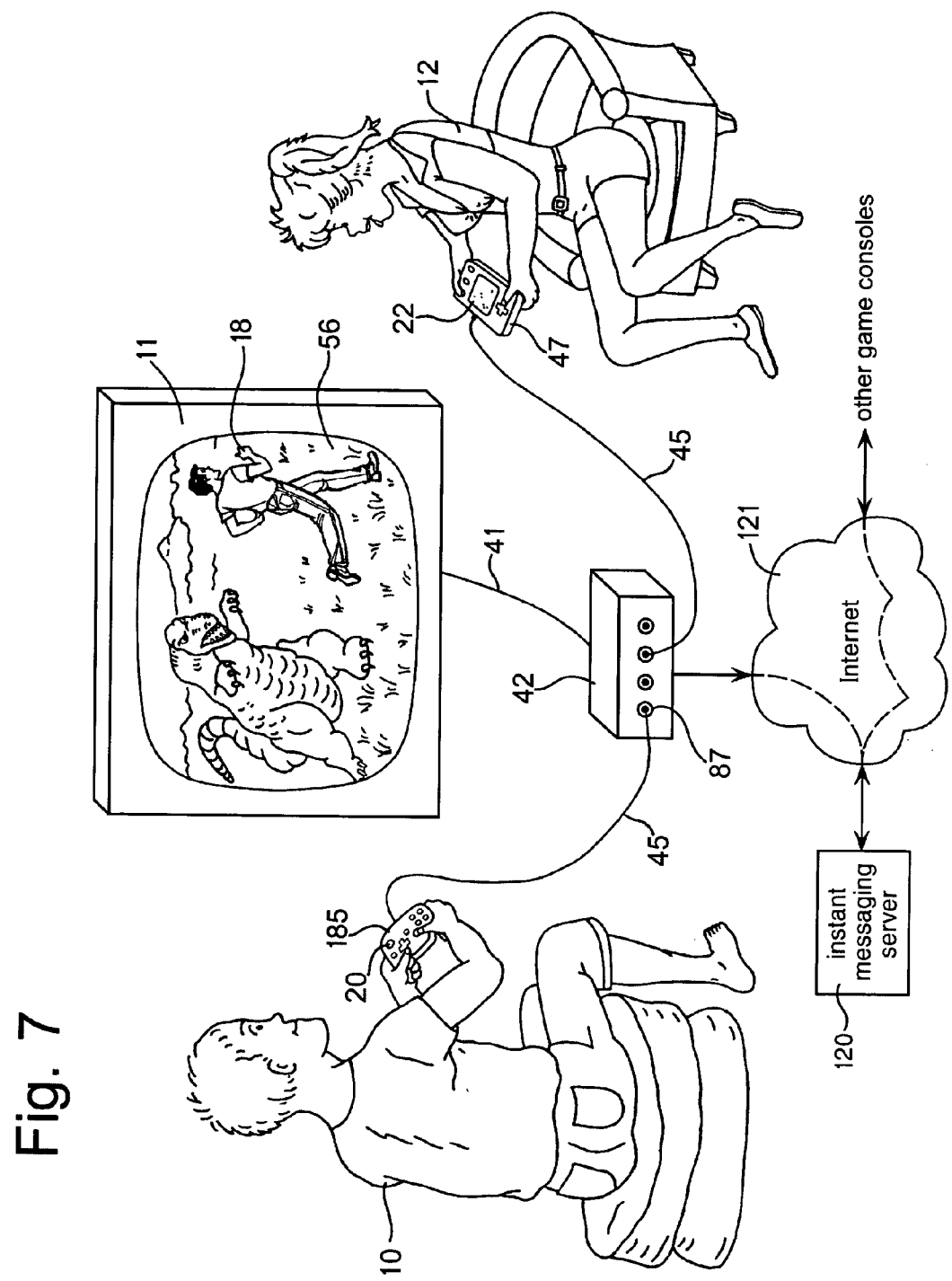
FIG. 7 is a perspective view of two game players controlling the same video game console that is connected through the Internet to other game consoles.

FIG. 7 illustrates another embodiment in which two players 10 and 12 are sitting in the same room and share a common television screen 56. Player 10 is not viewing a portable LCD in this example, because he is busy controlling his player character 18. Player 12 is not controlling the dinosaur scene, but is controlling the image being displayed on her portable game system 47 LCD 22 which in this example is the map 33 described above with reference to FIG. 6. As players 10 and 12 are coping with the dinosaur, other distant players are controlling their player characters in other parts of the same simulated 3D world as characters 17 and 18 and the dinosaur. Those other players can view on their portable LCD's the same scene that appears on television screen 56 in FIG. 7, because system 42 in FIG. 7 transmits status data to the other systems through Internet 121.

Figure 8:
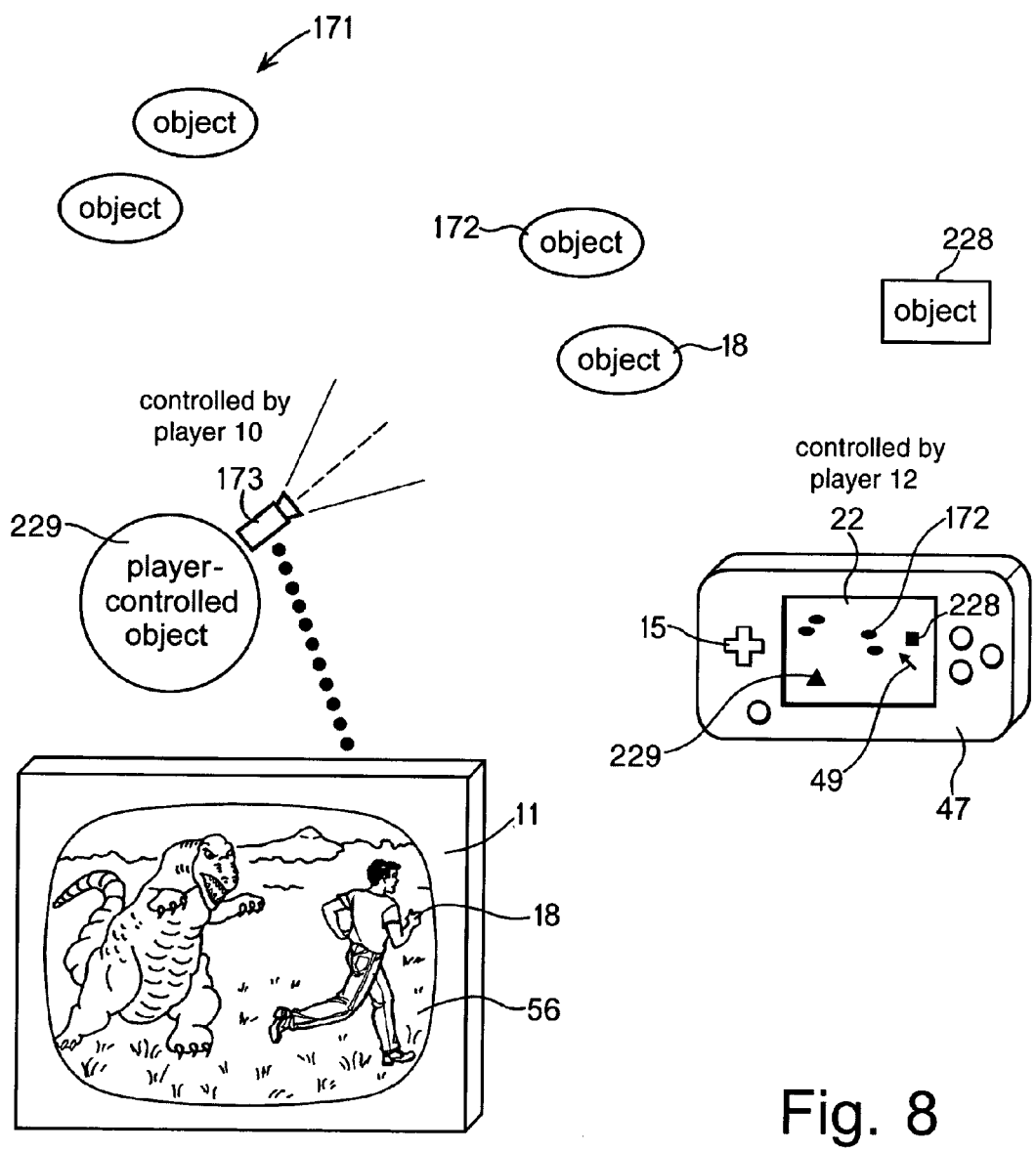
FIG. 8 is a perspective view and block diagram of the TV screen and portable game system illustrated in FIG. 7 and showing a virtual camera viewing objects that also appear as symbols on an LCD screen.

FIG. 8 illustrates a variable point of view as seen from a virtual "camera" 173 from the perspective of player controlled object 229. Television screen 56 displays the dinosaur 172 and character 18 which are represented as objects 172 and 18 at the top of FIG. 8 are are within the viewing angle of virtual camera 173. Objects 171 and object 228 are "off camera" and do not appear on television screen 56. On portable game system 47 LCD 22, all of the above objects appear as geometric symbols on a map including player object 229 which may be controlled by a third player (not shown) over the Internet.

Also displayed on the FIG. 8 LCD 22 map is cursor 49 which player 12 may control with direction switch 15 to position the cursor on an object or empty area of the map to select another point of view for display on LCD 22. Cursor 49 may also be used to select an object to control or otherwise make use of.

Figure 9:
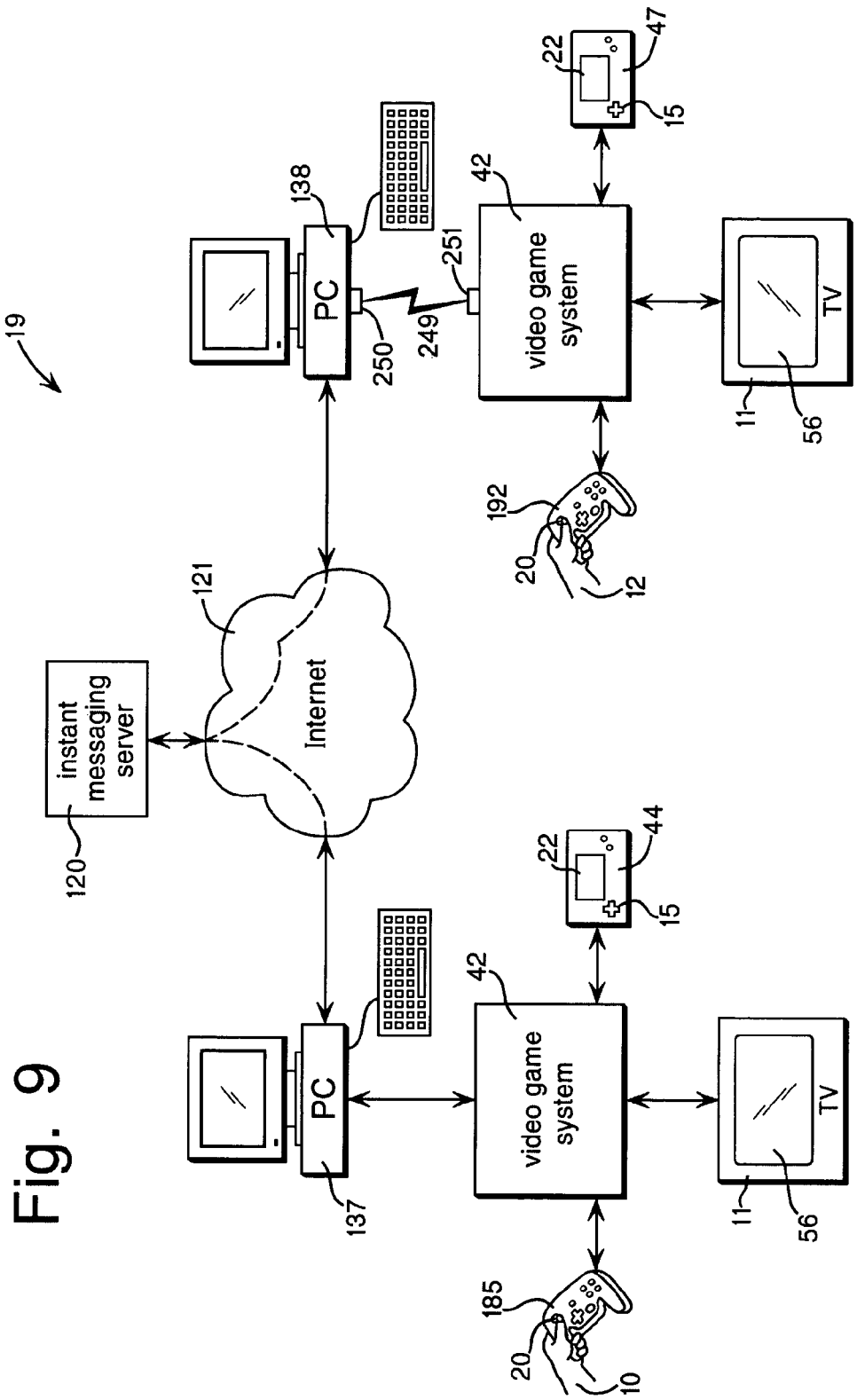
FIG. 9 is a block diagram of an embodiment in which two video game consoles are connected through personal computers and the Internet to an instant messaging server.

FIG. 9 illustrates another embodiment with makes uses of personal computers 137 and 138 to process data from connected keyboards on which to key IP numbers, phone numbers, account numbers, and passwords, and to provide software and access to an Internet Service Provider (ISP) and to send the account numbers and passwords to logon to a multi-player session. This may be used with video game systems 42 that lack a keyboard or network hardware or software. The connection between each video game system 42 may be with wires such as USB cables or a wireless connection 249 between transceivers 250 and 251.

Figure 10:
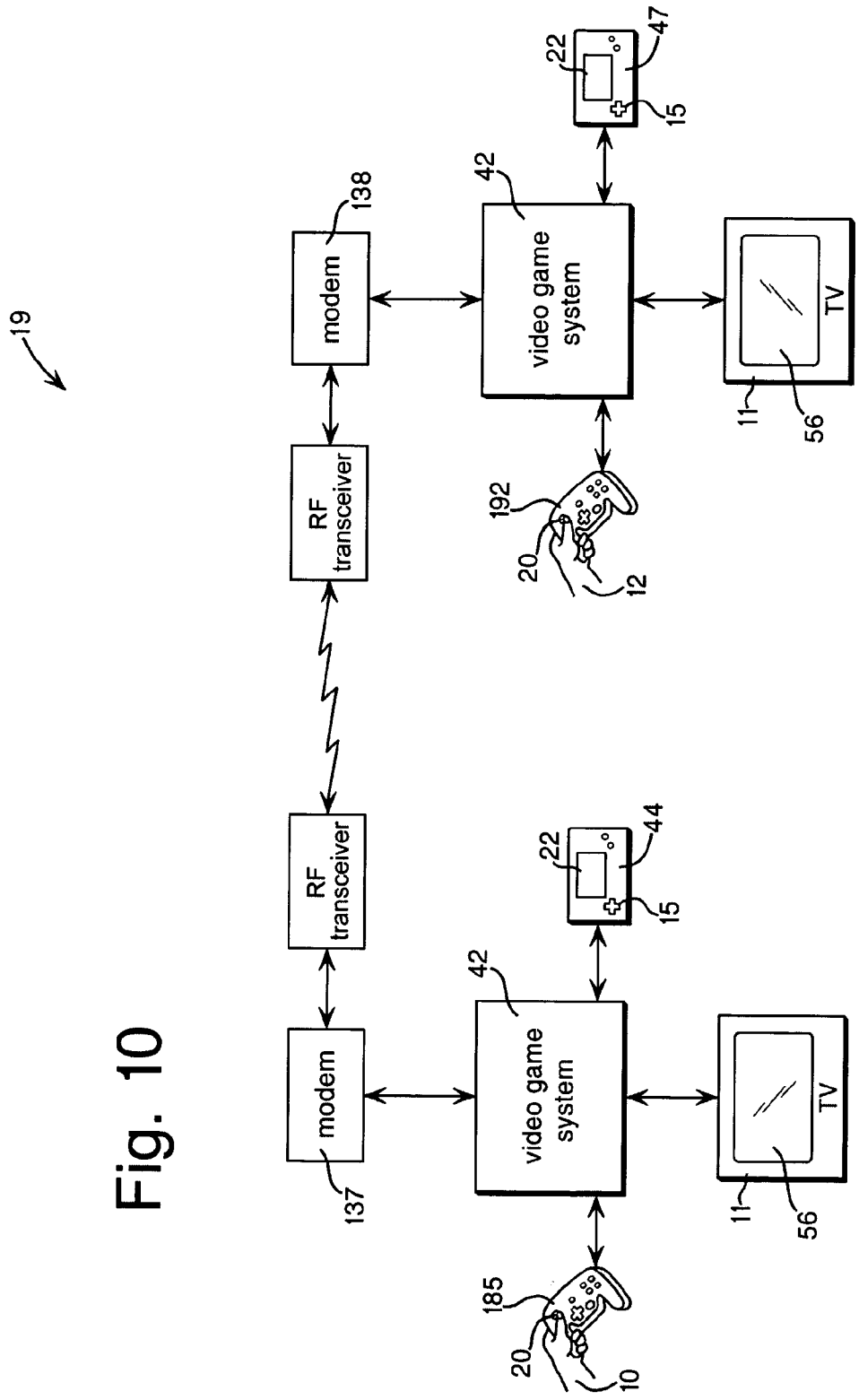
FIG. 10 is a block diagram of an embodiment in which two video game consoles are connected through short-range RF transceivers.

FIG. 10 illustrates another embodiment which links two video game systems 42 with a short range radio connection for two game players who live only a short distance apart.

Figure 11:
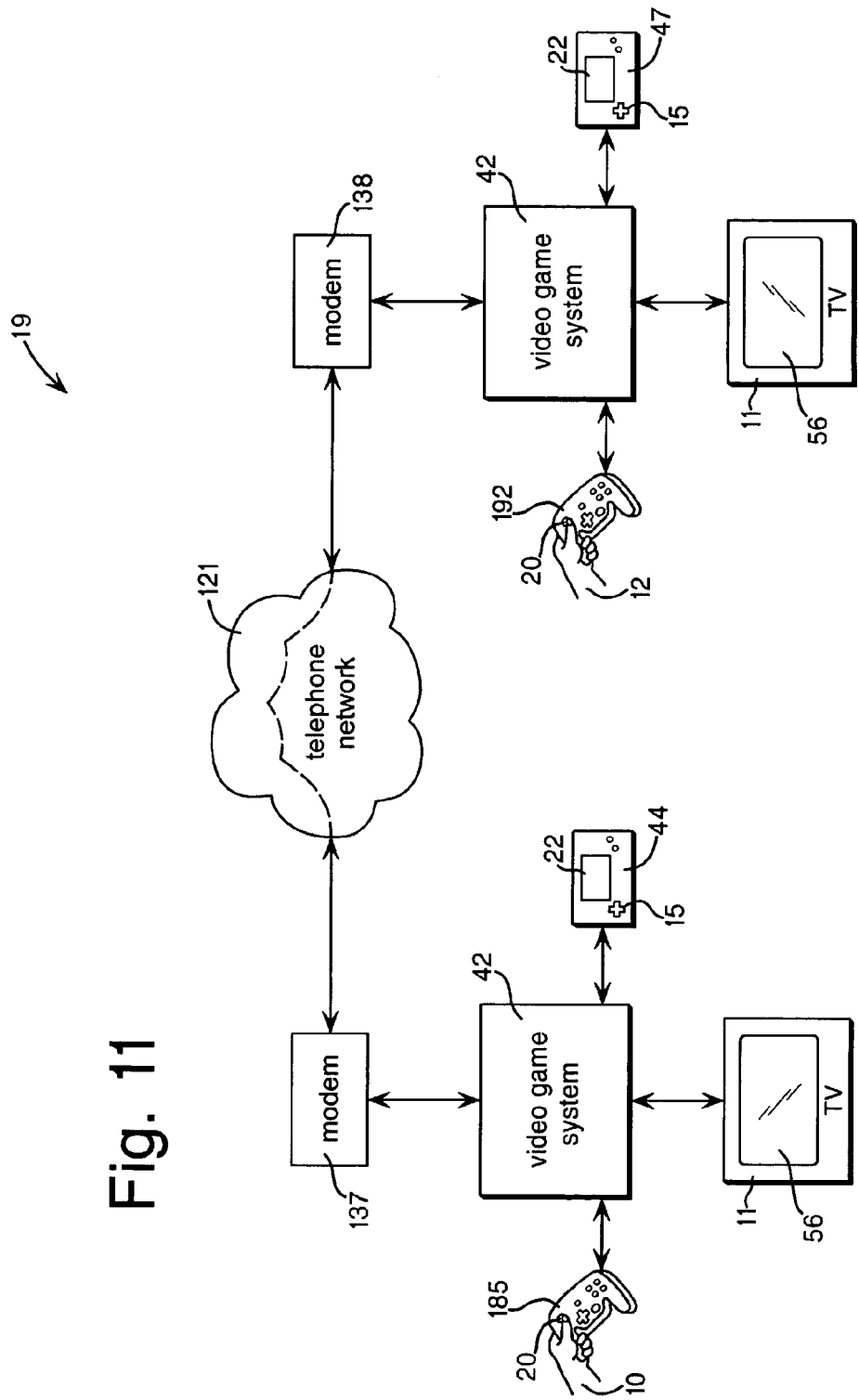
FIG. 11 is a block diagram of an embodiment in which two video game consoles are connected through a telephone network with no messaging server.

FIG. 11 illustrates another embodiment which links two video game systems 42 through modems 137 and 138 through a local dialup telephone system. This would be limited to two or three players who live in the same city. Each video game system 42 would have software for sharing status data records 78 with the other system 42.

Figure 12:
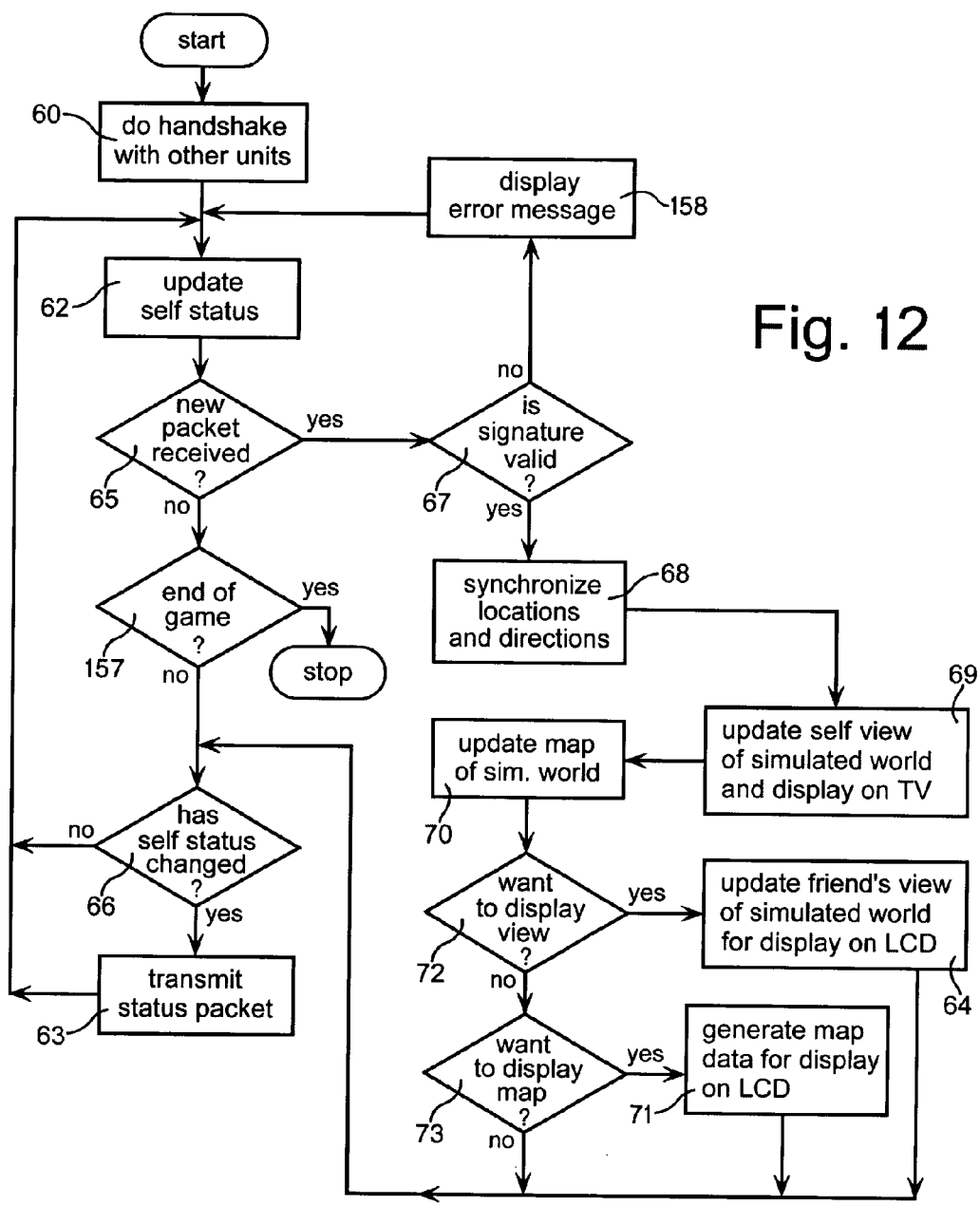
FIG. 12 is a flow chart illustrating processes performed by each video game system.

FIG. 12 is a flowchart that illustrates examples of some of the processing performed by CPU processor 86 in each video game system 42. When a data connection is established through the Internet or other network between two or more video game systems 42, process 60 in each system 42 sends a record similar to records 78 in FIG. 13 to messaging server 120 to identify the player and the player character or object to be controlled by that player. Server 120 then sends a data record to each video game system 42 that identified the session number and game id and a common time/date to eliminate any time zone and clock synchronization problems. Each video game system 42 sends confirmation data records back to the server which checks that all systems are synchronized.

After conflicts are corrected and this handshake process 60 is completed, process 60 initializes a "self status" table of data that specifies the initial spatial coordinates and orientation of each player character, and other initial data. Process 60 sends this initial data as status data records 78 to other systems.

Process 62 then updates this self status table if a player has moved his character.

Process 65 then checks for any incoming status data records. If a packet of status data has been received, process 67 checks the packet for invalid session id numbers, player id numbers, impossibly large movements of objects, and other signs of invalidity.

If no invalid data is found by process 67, process 68 processes the incoming status data records and updates the 3D variables representing player character motion and other changes in status indicated by the incoming data. Process 68 also checks the time stamp and message serial number to detect delayed data, to resolve conditions where one data record is received before a second record but with a later time stamp, and to resynchronize elapsed time with other systems.

Process 69 then updates the self view of the simulated 3D world and updates the image data from which a video signal is generated for display on the television screen. One example of a change in status that can greatly affect the displayed image of the self player character is if another character has collided with the self character. The self video game system 42 discovers that such a collision has occurred by receiving a status data record from the system 42 that moved the colliding character into or near the coordinates of the self player character.

After the 3D data for the simulated game world has been updated by process 69, process 70 updates a 2D map of the simulated world and transmits the map in a compressed form that can be transmitted quickly to portable game systems 44 and 47 for display on LCD 22.

Process 72 checks for requests for an LCD display of another player's view of the simulated world (as described above with reference to FIG. 5) and generates data records containing the coordinates and orientation of all moving objects that can be viewed from the requested point of view and viewing angle. These generated data records are then transmitted through link 186 (FIGS. 3 and 4) to portable game system 44 or 47 so that processor 50 and coprocessor 301 can generate the requested image on LCD 22. Alternatively, process 64 may generate and transmit data for all moving objects to portable game system 44 or 47 at infrequent intervals whether requested or not.

Process 73 checks for requests for an LCD display of a map of a selected area of the simulated game world (as described above with reference to FIG. 6) and if requested, process 71 then generates map data records containing the coordinates and orientation of all moving objects that are represented within the selected map area. Process 71 then transmits these generated map data records through link 186 (FIGS. 3 and 4) to portable game system 44 or 47 so that processor 50 can generate the requested map on LCD 22. Alternatively, process 71 may generate and transmit data for all moving objects to portable game system 44 or 47 at infrequent intervals whether requested or not.

Process 66 determines if the self status has changed, either because of the self player manually caused generation of control data that affected the self status or because an incoming status data record indicated that another character or object caused a change in self status. If process 66 determines that self status has changed, process 63 generates an outgoing status data record and transmits it to messaging server 120 to be shared with other video game systems 42.

FIG. 13 illustrates examples of several variable length record formats of status data records 78 that are transmitted through the Internet between video game systems 42. Each example record format has six fields in common: a record format code indicating which format a record has, an elapsed time stamp in milliseconds or other convenient time unit, a message serial number for each system, a session number assigned by the messaging server, a player identifier that is different for each game system in a session, an object identifier that identifies a player character, non-player character, and moving objects such as a swinging door or falling rock. Non-moving object such as a wall have identifiers to identify collisions, but do not require location or movement data.

Movement records specify 3D Cartesian spatial coordinates and velocity vectors. Orientation records specify heading (azimuth), pitch, and roll angles and rate of rotation of heading in case a character is turning around rapidly. Rates of rotation for the other two dimensions are not shown. Collision records specify which object collided with which object. Character animation records specify whether a character is swimming, flying, jumping, etc. Since these animations are stereotyped and preprogrammed, there is no need to specify every small motion. Attribute records specify attribute-value pairs such as degree of strength, type and number of weapons, weight of an object, rate of growth, and other attributes. Entry records specify which object is passing through which door or other portal and in which direction. Many other record types and formats may be used.

FIG. 14 illustrates two examples of variable length initializing record formats that are sent from messaging server 120 to each video game system 42 at the beginning of a session. The first record in FIG. 14 tells each system 42 which session id, game id, and player id to use in status records that each system 42 sends to the other systems 42. The Internet Protocol address field tells each video game system 42 what the current IP numbers are for each player, so that most message traffic can be sent direct through the Internet to all of the other systems 42, thereby reducing delays in transmission through messaging server 120.

The second record in FIG. 14 provides the screen name of each player to all of the other players in a session, so that word messages displayed on LCD 22 can refer to a specific player in systems that have a keyboard (see FIG. 9) for entering messages.

Figure 15:
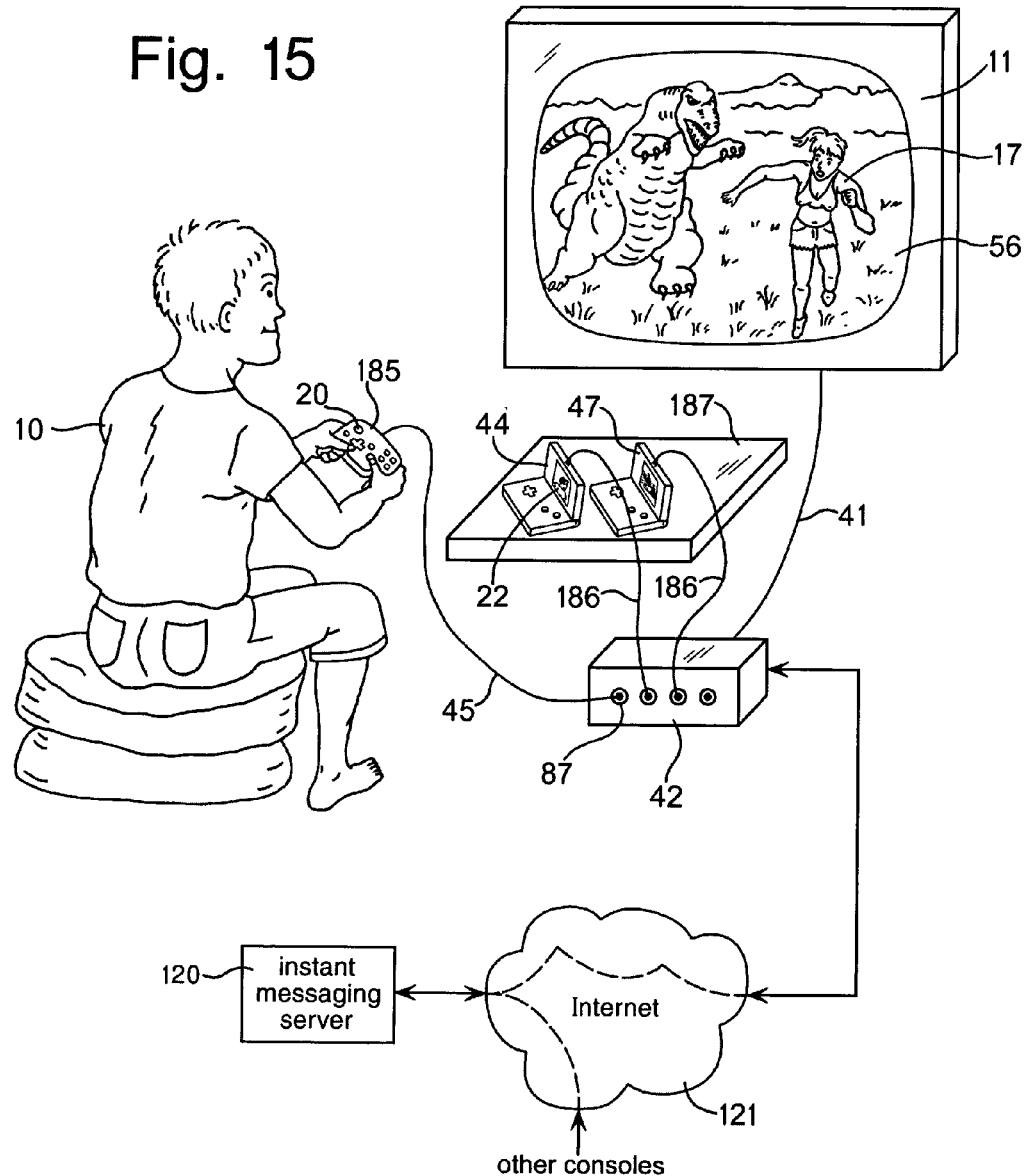
FIG. 15 is a perspective view of a game player controlling a video game console linked to two portable game systems operated as auxiliary display devices.

FIG. 15 illustrates use of multiple portable game systems 44 and 47 being used by player 10 as auxiliary displays, each displaying a different player character or other view of the simulated game world on an LCD 22. Multiple displays may be useful in war and crime games in which each LCD 22 is like a security camera or guard station monitor.

Figure 16:
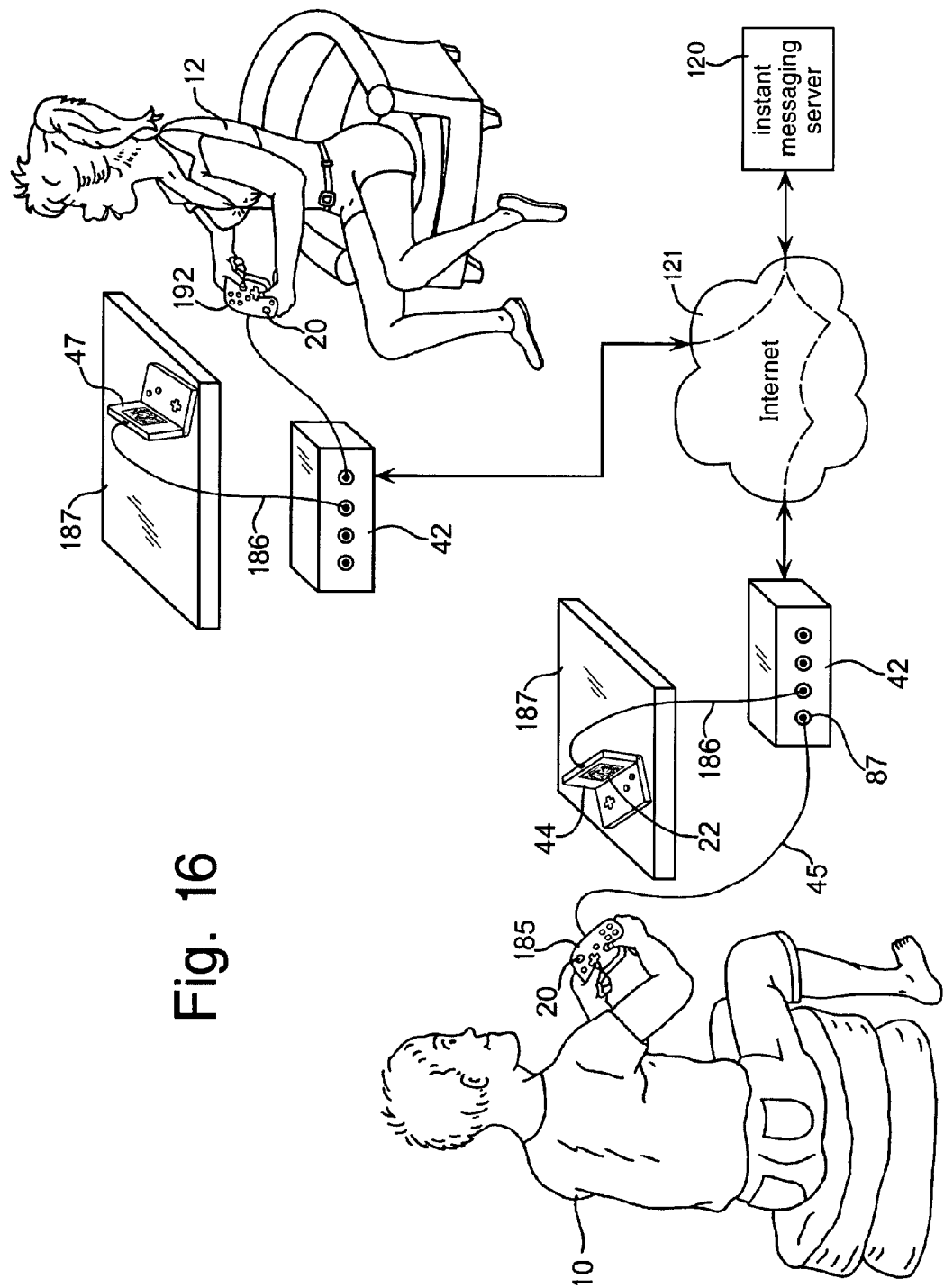
FIG. 16 is a perspective view of two game players controlling video game consoles connected through the Internet and using auxiliary display units.

FIG. 16 is an example of players using conventional controllers 185 and 192 to control separate video game systems 42 that are linked to portable game systems 44 and 47 as substitutes for television screens. This embodiment may be useful in situations where a player does not have access to a television.

Figure 17:
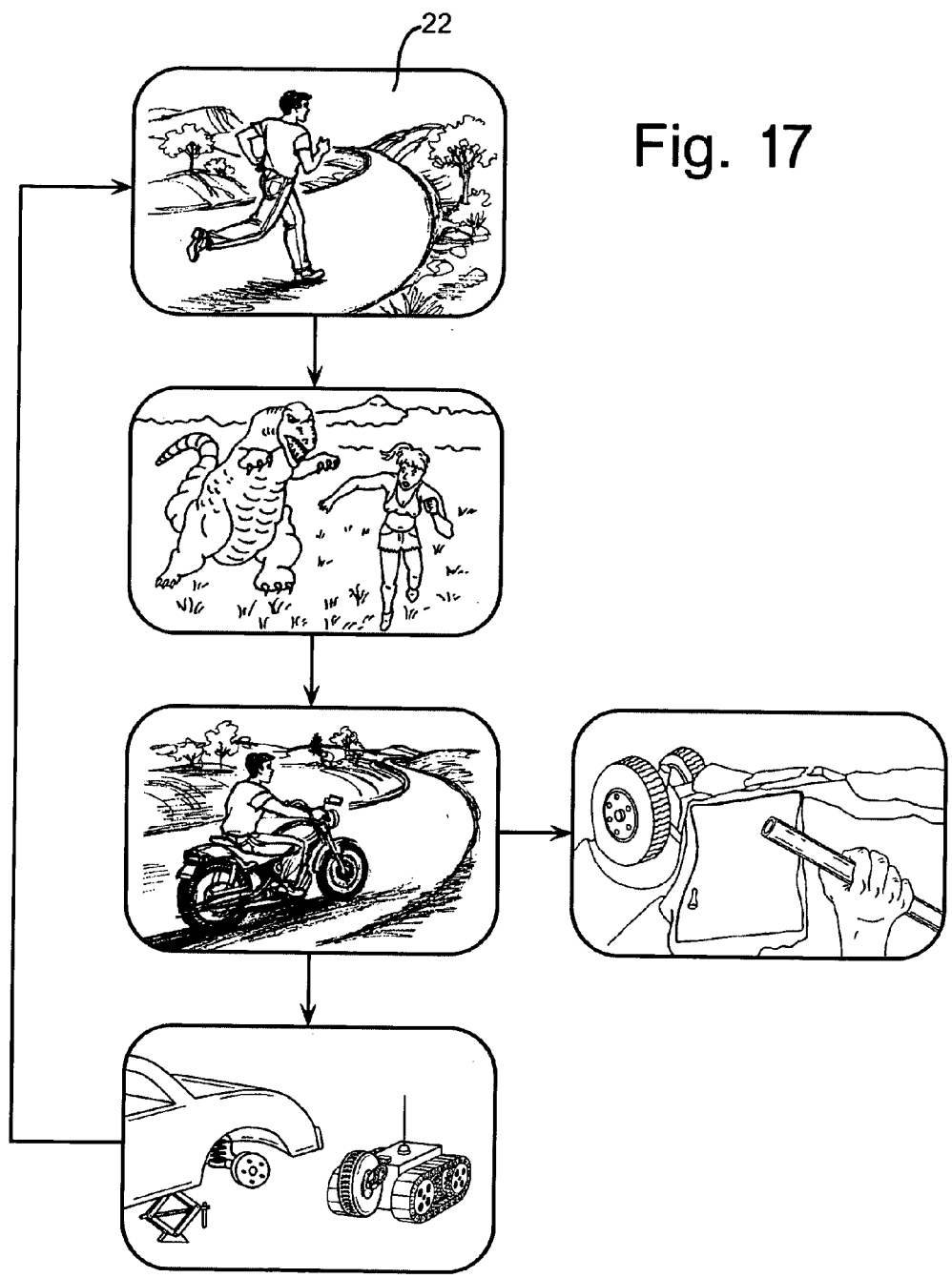
FIG. 17 illustrates a player-selected sequence of pictures displayed on an LCD in a portable game system.

FIG. 17 illustrates a sequence of views of player characters displayed on an LCD 22 in a portable game system 44 or 47. A player can cycle through this sequence by pressing control members 14 or 15 on the portable game system.

Figure 18:
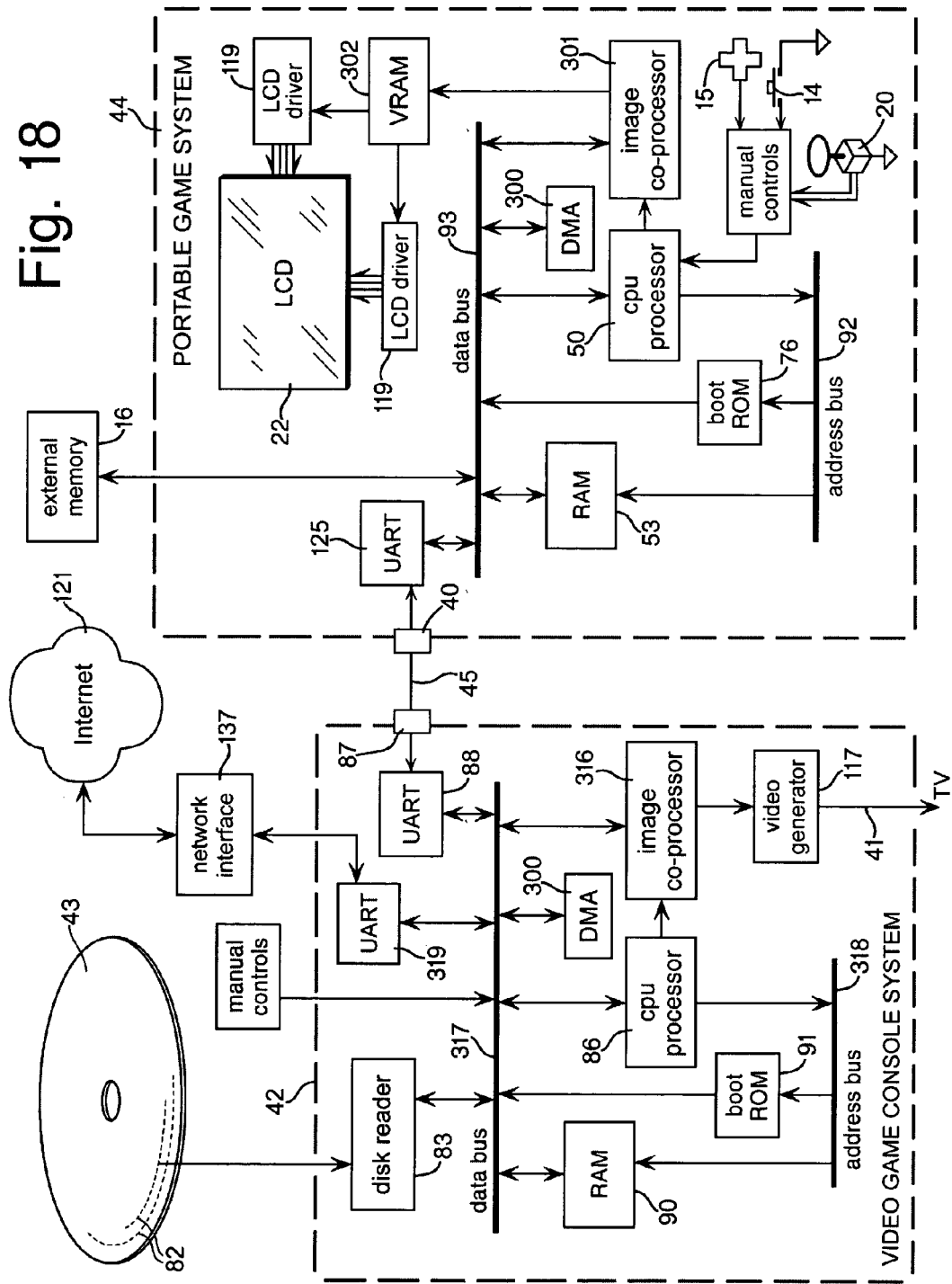
FIG. 18 is a detailed block diagram of a video game console system linked to a portable game system and to the Internet.

FIG. 18 is a detailed block diagram of video game system 42 linked by a serial data communication link 45 to portable game system 44 or 47. Both systems 42 and 44 have CPU processors 86 and 50 and image co-processors 316 and 301 that generate simulated 3D images with rendered polygons or other methods of depicting 3D characters from different 3D points of view and viewing angles that may be rapidly changing. Characters generated by these four processors should have multiple body parts and joints that bend in a natural manner.

Software for use in video game system 42 and portable game system 44 or 47 is distributed on disk 43, which may be an optically readable disk such as a CD-ROM or DVD. Tracks 82 on disk 43 hold programs of executable instructions, graphics data for processing by those programs, and other kinds of data.

Programs accompanied by data are read from tracks 82 by disk reader 83 into RAM 90. These programs may be of two kinds: programs 151 (see FIG. 24) to be executed in cpu processor 86 and/or image co-processor 316, and programs 152 (see FIG. 24) to be downloaded through UART 88, serial data transmission link 45, UART 125 and stored in RAM 53 for execution in cpu processor 50 and/or image co-processor 301.

Optional external memory 16 may be a ROM cartridge, battery powered SRAM, or a data disk such as a CD or DVD. Programs accompanied by data, may be stored in external memory 16, read into RAM 53, and executed in processor 50 and co-processor 301. In the preferred embodiment, programs 152 and data are downloaded from RAM 90 in video game system 42 to RAM 53 in portable game system 44 and 47, so that all programs and data for a given game title may be distributed on disk 43.

Network interface 137 is activated by data from processor 86 which causes interface 137 to access messaging server 120 through the Internet 121 as described above with reference to FIGS. 1, 2, 13, and 14.

In FIG. 18, image coprocessor 301 may perform scrolling, flipping, blending, scaling, rotating, fading, windowing, coordinate transformations of polygons, texture rendering, bump mapping, lighting and shadows, rasterizing polygon data into displayable pixel data in RAM (VRAM) 302 and other image processing functions for display on LCD 22.

Figure 19:
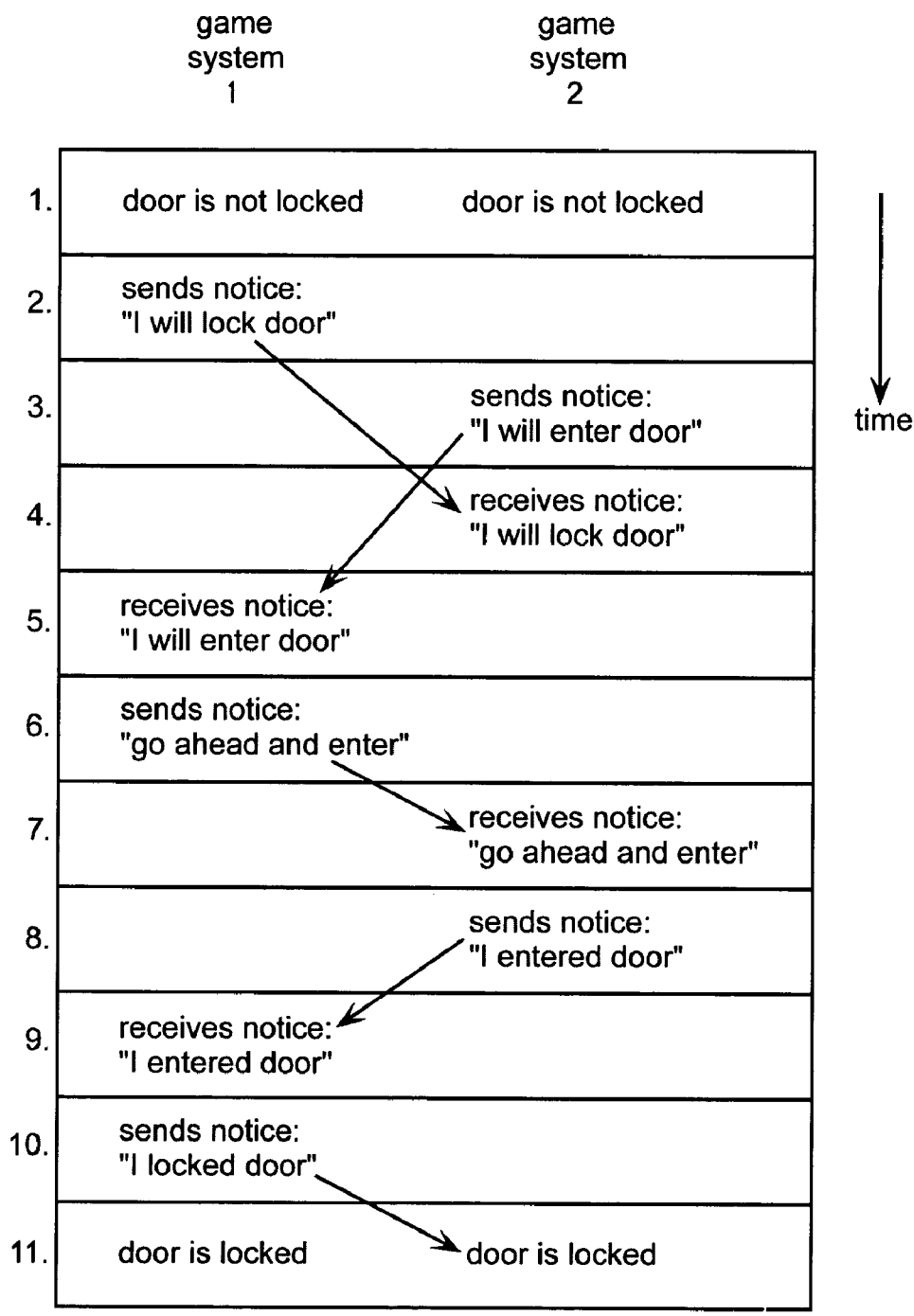
FIG. 19 is a time sequence example of two communicating game systems using semaphores to synchronize the two systems during delays in message transmission.

FIG. 19 illustrates a time sequence, from top to bottom, of processing by two video game systems 42: (1) in the left column and video game system 42 (2) in the right column. Because of variable delays in transmission of packets through the Internet, some status data records 78 may be delayed more than others and some records may arrive out of sequence. This may cause an unintentional reversal of recent status data being replaced with older data. To prevent this problem, semaphores are used as illustrated in FIG. 19. A semaphore in this context, is data from one system to a second system that blocks further processing in the second system until the semaphore data is received by the second system.

In the FIG. 19 example, a first character controlled by system 1 is about to lock a door, but a second character controlled by system 2 is about to enter the same door. If the two characters arrive at the door at about the same time, one system may record the second character status as having entered, while the other system may record the second character status as having been blocked by the locked door. Later, if the second character is reported as beyond the door, the inconsistency in status can be automatically corrected. But it is better to avert this problem, because two player may be watching their first and second characters approach the door and should not be misled by false imagery. Whether the second character enters or is blocked, the status of the second character should be the same in all systems in a session.

In FIG. 19 at time 1, both systems agree on the "door is not locked" status. At time 2 system 1 sends a status record that notifies other systems of the intention to lock the door. At time 3 system 2 sends a status record that notifies other systems of the intention to enter the door. The two notices cross in cyberspace. At time 4 system 2 receives the lock notice record, but must disregard it until system 1 responds to the entry notice. At time 5 system 1 receives the entry notice. At time 6 system 1 sends a "go ahead" notice. At time 7 system 2 receives the "go ahead" notice. System 2 then updates the status of the second character as having passed through the door and updates the character's location as beyond the door. At time 8 system 2 sends this location change that confirms that the second character has passed through the door. At time 9 system 1 receives the location change record and updates the location status of the second character. At time 10 system 1 updates the status of the door as locked and sends a "door locked" notice. At time 1 system 2 receives the "door locked notice and updates the door status as locked. At time 11, both systems agree on the status of the locked door and the location of the second character.

To avoid a deadlock (actually livelock because it can be interrupted) situation in which each system is waiting for the other system to do something and thereby blocks further progress in the game in all systems, perhaps because one of the semaphore records failed to arrive or because of a bug in a program, there should be a time limit of about two seconds on semaphore records. After the time limit has passed, the location data should force a status change in all systems in a session so that the game can proceed.

If the above description of FIG. 19 seems like unnecessary complexity, remember that the goal is to allow all players to display what all characters are doing and to accurately display the results of their prior actions without transmitting huge amounts of video data over the Internet.

Transmitting video would not look real because of transmission delays and would not solve the problem of status updating.

Figure 20:
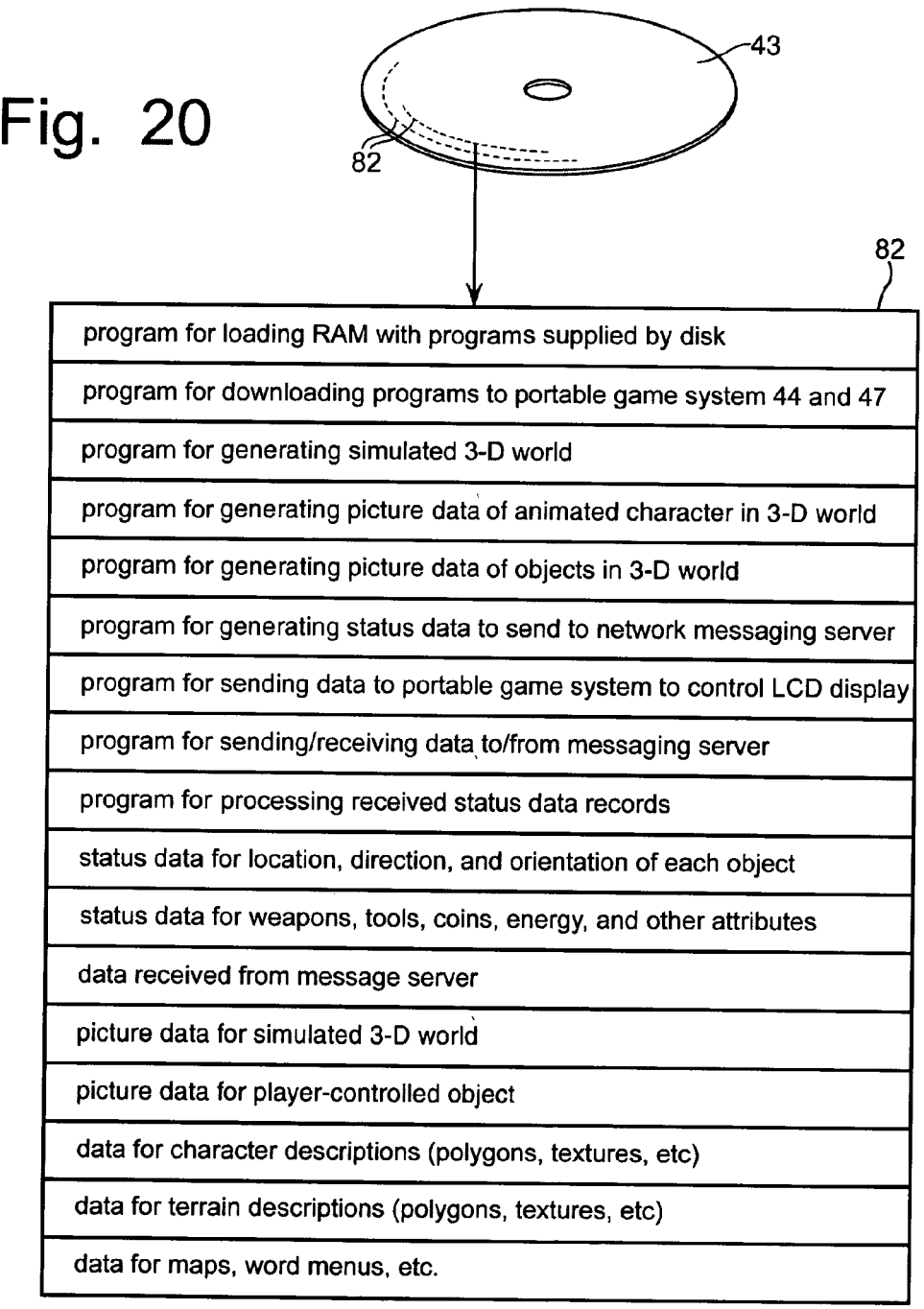
FIG. 20 is a memory map of the digital programs and data stored on a computer-readable data storage disk product.

FIG. 20 is a memory map of the digital programs and data stored on a computer-readable data storage disk product 43. Some of these programs are executed in video game system 42, some are executed in portable game system 44, and some are executed in both systems.

Figure 21:
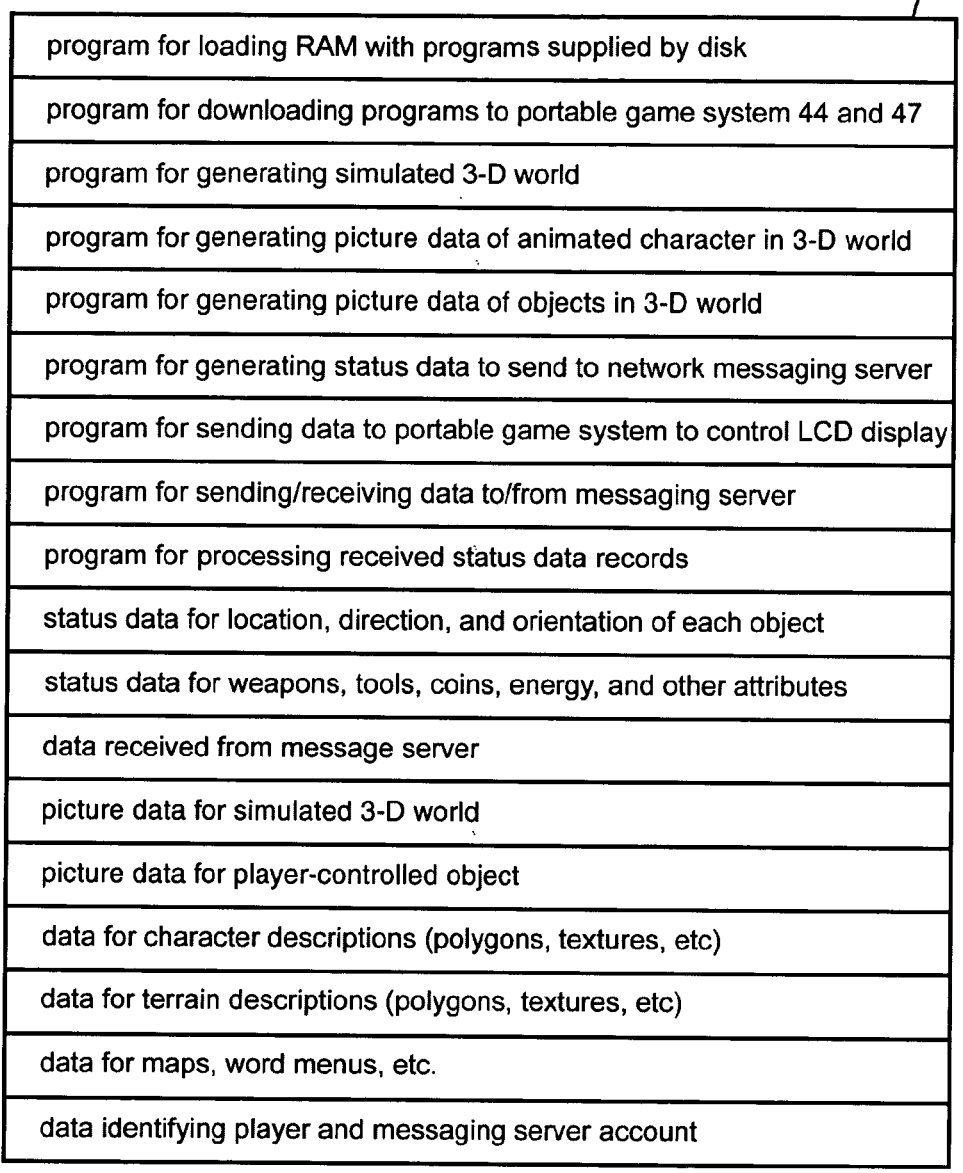
FIG. 21 is a typical memory map of programs and data stored in RAM in each video game console.

FIG. 21 is a typical memory map of programs and data stored in RAM 90 in each video game console 42. See FIG. 18 for RAM 90.

Figure 22:
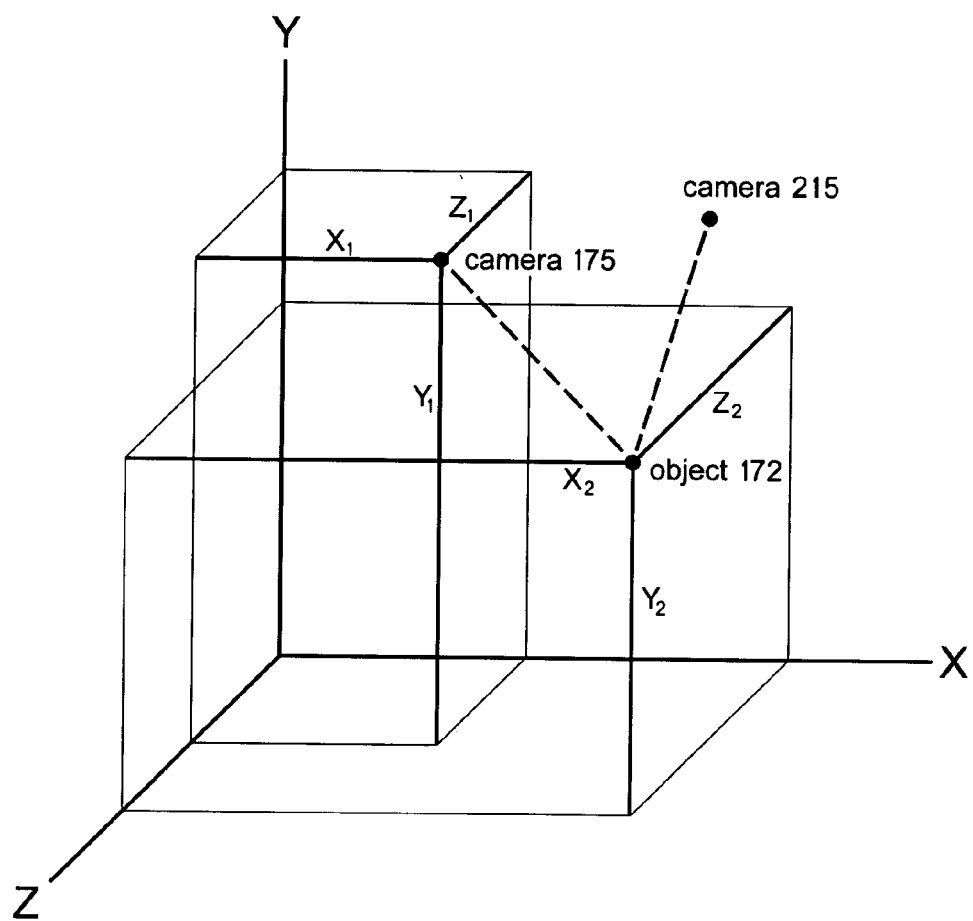
FIG. 22 is a 3D cartesian graph illustrating 3D points of view of a virtual camera viewing a simulated object from different viewing angles.

FIG. 22 is a three dimensional (3D) graph illustrating Cartesian coordinates ($X_1$ $Y_1$ $Z_1$) of an exemplary virtual camera 175 and coordinates ($X_2$ $Y_2$ $Z_2$) of an exemplary object 171 being photographed by the virtual camera. See example in FIG. 8. Polar coordinates would also be an appropriate equivalent. For clarity, coordinates are not shown for camera 215 which may be the same as camera 175 but at different point of view location in the simulated 3D world. The viewing angle from camera 215 to object 172 is different than the viewing angle from camera 175 to object 172.

Figure 23:
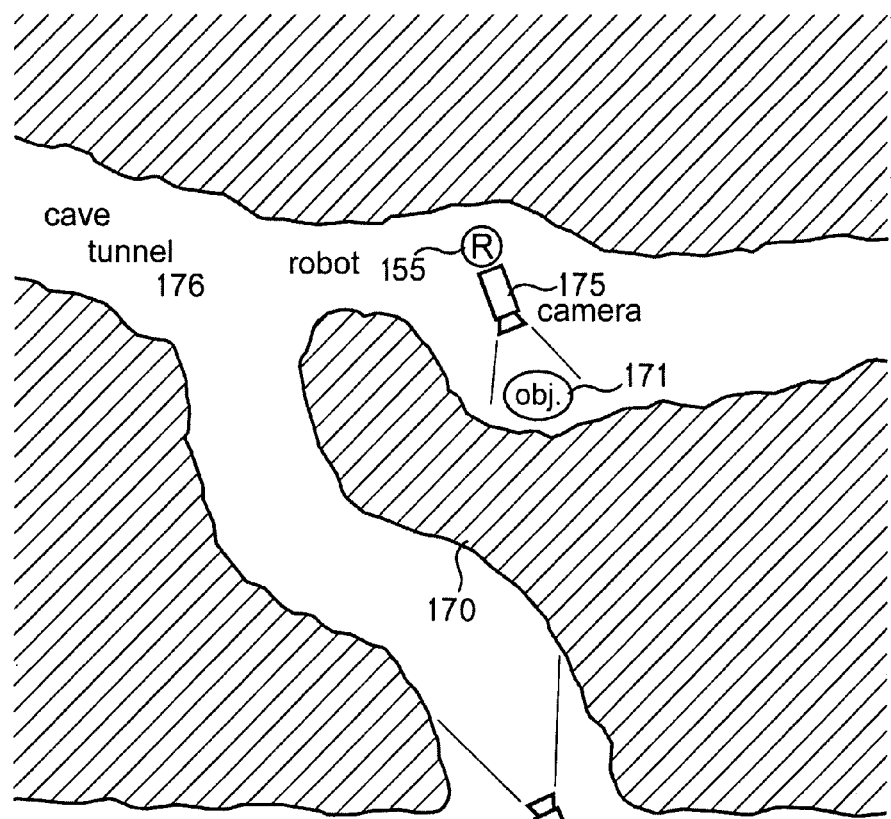
FIG. 23 is a cross-sectional map view of a cave tunnel in which a robot camera is focused on a hidden object that is not observable from the point of view of a player-controlled character.

FIG. 23 illustrates a map view of a video game in which two player-controlled characters (animated character 17 and robot character 155) are controlled by the same human player, although in some embodiments not all functions of both characters can be controlled simultaneously. If more than one player is playing this game, each player can control multiple characters individually and in groups. In the FIG. 23 example, animated player-controlled character 17 is standing at the entrance to a cave tunnel 176 shown in cross-section with walls 170. From the point of view of character 17, object 172 is displayed on LCD 22 (FIG. 5) when her "camera" 173 is pointed at angle 177.

Figure 23A:
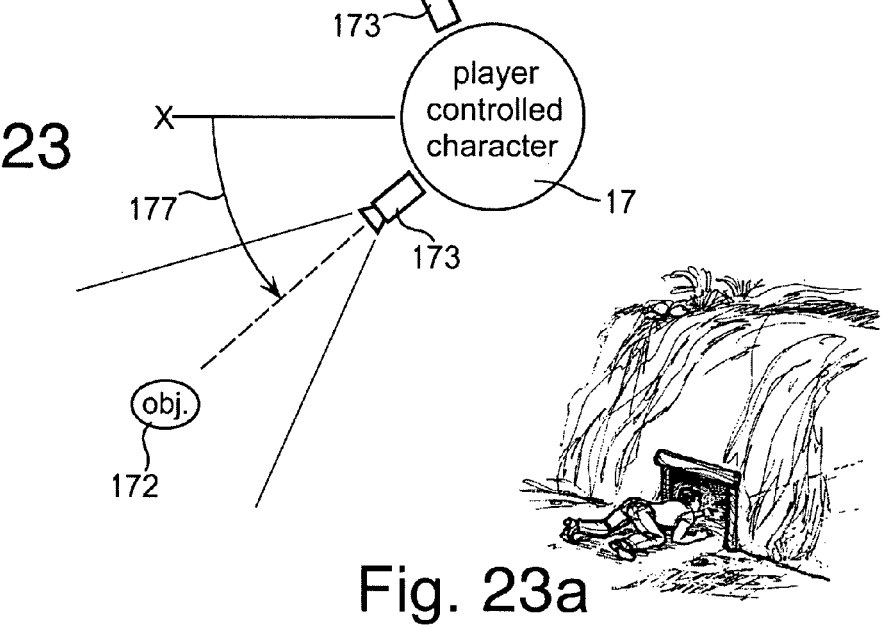
FIG. 23a illustrates a player-controlled character entering a cave tunnel.

FIG. 23a illustrates a player character entering cave tunnel 176 as shown in FIG. 23.

FIG. 24 is a simplified block diagram illustrating downloading of game programs from video game system 42 to portable game system 44. When disk reader 83 reads game programs into RAM 90, the programs in this example are of two kinds, console program(s) 151 with associated data, and controller program(s) 152 with associated data. Controller program 152 is transmitted to RAM 53 in portable game system 44 and executed in microprocessor 50. Console program 151 is stored in RAM 90 and executed by microprocessor 86 which generates animated picture data 146 representing one or more animated characters with plural body parts performing an action. This picture data stored in RAM 146 is converted to a video signal by video generator 117 (see FIG. 18) that is passed to TV 11 by way of cable 41 (FIG. 18) and is displayed as animated pictures on TV screen 56. Microprocessor 86 also generates data records which it sends (arrow 154) to portable game system 44. Various record formats may be used by programs 151 and 152.

Figure 25:
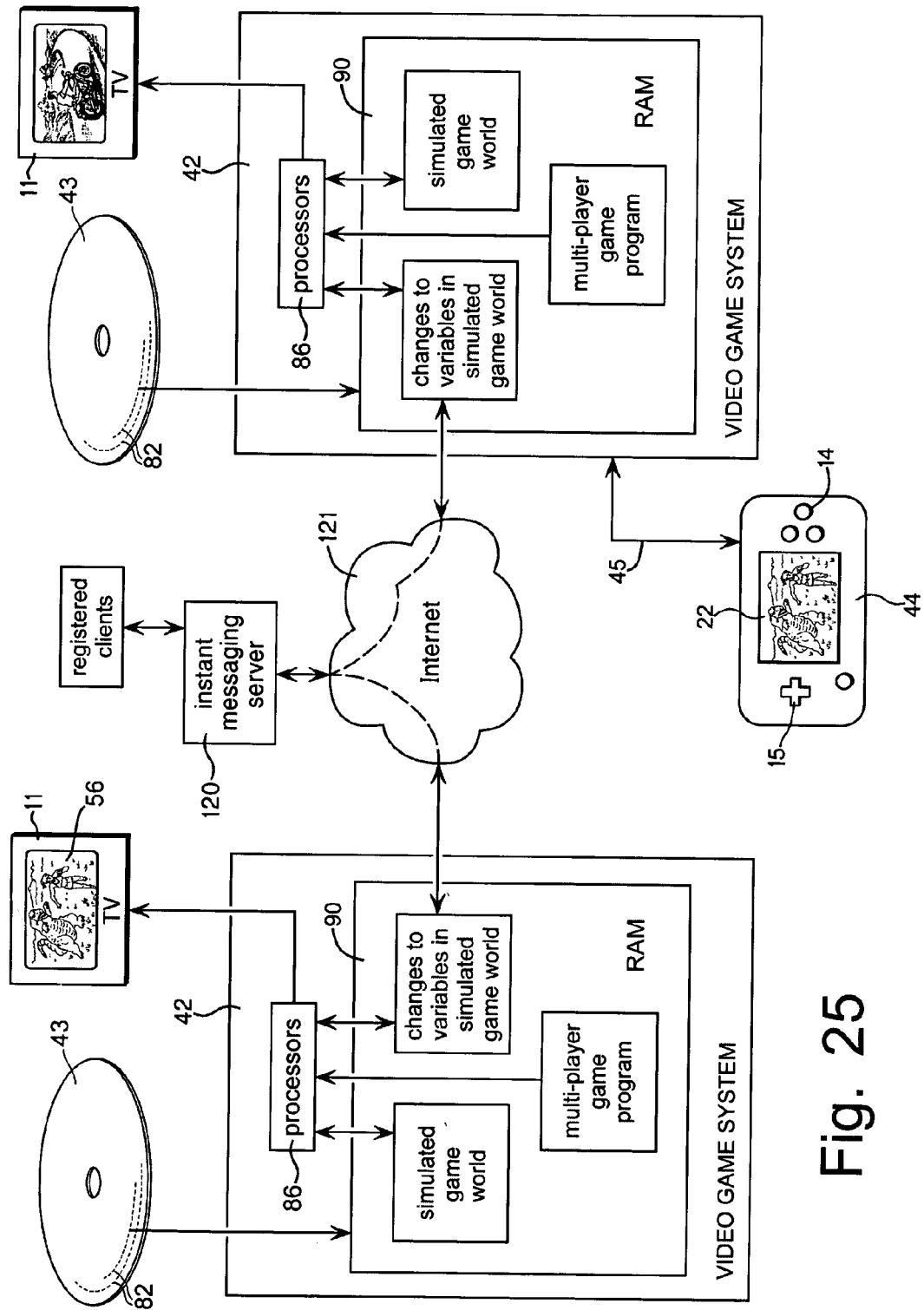
FIG. 25 is a block diagram illustrating data flow between systems.

FIG. 25 illustrates data flow between two video game systems 42, messaging server 120, and portable game system 44. When the operators of the two systems 42 logon to messaging server 120, they are registered as clients on the messaging server. System 42 on the left loads a multiple-player game from disk 43 into RAM 90. Meanwhile System 42 on the right loads the same multiple-player game from disk 43 into RAM 90 on the right. Processors 86 in both systems 42 execute the game programs which generate data representing a simulated 3D game world in RAM 90 in both systems.

As the game progresses, system 42 on the left generates changes to the original game world that reflect movements of objects and other changes to variables in the simulated game world. These changes are cumulative and in FIG. 25 are illustrated separately from the original game world. As described above with reference to FIG. 13, every time there is a change to a variable in the simulated game world, record is generated detailing the change. This record is transmitted through Internet 121 to system 42 on the right of FIG. 25, either directly or through messaging server 120. When system 42 on the right receives the change record, it is processed and incorporated into the cumulative changes to the simulated game world in RAM 90 on the right so that both simulated game worlds including cumulative changes are substantially the same.

System 42 on the right generates first picture data for display of the motorcyclist character 18 moving in the simulated game world on TV 11 that agree with any changes to the game world that affect character 18 or other objects that he may be seen with.

System 42 on the right also generates and transmits game data to portable game system 44 through data link 45. This game data represents all of the changes that have occurred to the simulated game world that affect the area of the game world that will be displayed on LCD 22 on portable game system 44. In this example the operator of portable system 44 wants to display on LCD 22 the other player's character in the dinosaur scene that is also being displayed on TV screen 56.

The term "video" may include composite, non-composite, RGB, component, monochrome, color, analog, digital, raster scanned, and the like.

The term "portable game system" is a term of art that means a handheld game system that contains a discrete display device (e.g. LCD) and can be operated as an independent game system without any connection to other systems or displays.

The details of video game system 42 and portable game system 44 are given here only as examples and numerous other designs may be used.

The term "LCD" (liquid crystal display) has been used herein as an illustrative example of any display apparatus having discrete dot-matrix picture elements.

The term "program" as used herein may consist of more than one loadable module and typically includes executable instruction data and any other data that is typically part of a program module or modules.

Although I have described my invention with a degree of particularity in connection with what is presently considered to be the most practical and preferred embodiments, the forgoing description has been made only by way of illustration and example and is not to be interpreted as restrictive or limiting as to the meaning of words in the patent or its claims. It is understood that various modifications, variations, arrangements, and/or equivalents, can be devised without departing from the spirit and scope of the invention which is defined by the claims.

REFERENCE NUMBERS IN DRAWINGS 10 human game player
11 television (TV) set or video monitor
12 human game player
14 control switch
15 direction control switch
16 external memory
17 player character 18 player character
19 linked system in general
20 joystick
22 LCD screen
33 LCD pictures
34 LCD pictures
40 serial data port in portable system
41 video signal cable to TV
42 video game system console
43 optical disk
44 portable game system
45 data link from console to portable game system
47 portable game system
49 cursor
50 cpu processor in portable system
53 RAM in portable system
56 video screen
57 control switch
60 program process
62 program process
63 program process
64 program process
65 program decision
66 program decision
67 program decision
68 program process
69 program process
70 program process
71 program process
72 program decision
73 program decision
76 boot ROM in portable system
78 data record
82 tracks molded into disk
83 optical disk reader
84 security processor
86 cpu processor in console system
87 serial data connector
88 serial port (UART)
90 RAM in console system
91 boot ROM in console system
92 address bus in portable system
93 data bus in portable system
117 video signal generator
119 LCD driver
120 messaging server
121 network
125 serial port (UART)
137 network interface
138 network interface
146 animated picture data
151 program for console system
152 program for portable system
153 data flow from portable to console
154 data flow from console to portable
157 program decision
158 program process
171 generic object
172 generic object
173 virtual camera
175 virtual camera
185 conventional handheld control unit
186 data link to auxiliary display
187 table or other physical support
192 conventional handheld control unit
215 virtual camera
228 generic object
229 player controlled object
230 cartridge socket
249 wireless data link
250 transceiver
251 transceiver
300 direct memory access (DMA)
301 image coprocessor
302 video RAM
316 image coprocessor
317 data bus in console
318 address bus in console
319 serial port (UART)
322 cartridge with button switches

I claim:

1. A method for use in a multi-player game system having a first game apparatus operated by a first player and a second separately housed game apparatus operated by a second player, the method comprising the steps of:

(a) generating in said first and second game apparatus polygon vertex data that represent shapes of a 3-dimensional first player-controlled object controlled by said first player and moving in a simulated 3-dimensional game world that contains a simulated passageway between first and second portions of said game world;

(b) rendering said polygon data to generate pixels that represent said first player-controlled object from variable viewpoints for display on a display device;

(c) generating digital location data in said first game apparatus that specify variable locations of said first player-controlled object in said game world;

(d) initiating transmission of said location data from said first game apparatus through a first data transmission link to said second game apparatus;

(e) initiating transmission of data from said first game apparatus through said data transmission link to said second game apparatus to cause said second game apparatus to send first status data through said data transmission link to notify said first game apparatus of availability of said simulated passageway for use by said first player-controlled object;

(f) receiving said first status data from said second game apparatus through said data transmission link that indicates to said first game apparatus that said simulated passageway is unavailable for use by said first player-controlled object;

(g) storing said first status data in said first game apparatus as attribute data having a value of unavailable for said simulated passageway;

(h) receiving second status data from said second game apparatus through said data transmission link that indicates to said first game apparatus that said simulated passageway is available for use by said first player-controlled object;

(i) changing said value of said attribute data from unavailable to available for said simulated passageway in accordance with said second status data;

(j) generating picture data for display on said display device that represents said first player-controlled object making use of said simulated passageway after said first game apparatus has determined from said attribute data that said simulated passageway is available for use by said first player-controlled object; and (k) initiating transmission of notification data from said first game apparatus through said data transmission link to notify said second game apparatus that said first player-controlled object has completed use of said simulated passageway.

2. The method of claim 1, wherein said simulated passageway is any from the group comprising: door, doorway, entrance, entranceway, entryway, gate, gateway, hatch, tunnel, ingress, egress, opening, inlet, accessway, passage, portal, exit, cave, other passageway, and a combination thereof.

3. The method of claim 1, wherein said data transmission link comprises any transmission means from the group comprising: wireless transmission, transmission through the Internet, transmission through a telephone network, transmission through an Internet server.

4. The method of claim 1, wherein said data transmission link comprises transmission through an Internet server that also provides instant messaging for communication of messages between registered players.

5. The method of claim 1, wherein said display device is an LCD device.

6. The method of claim 1, further comprising the step of generating control data in a touchscreen on a portable game system to control movements of said player-controlled object.

7. The method of claim 1, further comprising the step of generating control data in a touchscreen on a portable game system to control access to said passageway.

8. The method of claim 1, further comprising the step of transmitting game data from said first game apparatus to a portable game system to display a portion of said 3-dimensional world from a 3-dimensional viewpoint in said simulated game world.

9. The method of claim 1, further comprising the step of downloading at least one program from one of said game apparatus for execution in a portable game system.

10. A method for use in a multi-player game system having a first game apparatus operated by a first player and a second separately housed game apparatus operated by a second player, the method comprising the steps of:
(a) generating in said first and second game apparatus polygon vertex data that represent shapes of a 3-dimensional first player-controlled object controlled by said first player and moving in a simulated 3-dimensional game world that contains a simulated passageway between first and second portions of said game world;
(b) rendering said polygon data to generate pixels that represent said first player-controlled object from variable viewpoints for display on a display device;
(c) receiving first status data from said second game apparatus through said data transmission link to said first game apparatus that indicates that said simulated passageway is unavailable for use by said first player-controlled object;
(d) storing said first status data in said first game apparatus as attribute data having a value of unavailable for said simulated passageway;
(e) initiating transmission of notification data from said first game apparatus through a data transmission link to said second game apparatus to notify said second game apparatus that said simulated passageway is required for use by said first player-controlled object;
(f) receiving second status data through said data transmission link from said second game apparatus that indicates to said first game apparatus that said simulated passageway is available for use by said first player-controlled object;
(g) changing said value of said attribute data from unavailable to available for said simulated passageway in accordance with said second status data;
(h) generating picture data for display on said display device that represents said first player-controlled object making use of said simulated passageway after said first game apparatus has determined from said attribute data that said simulated passageway is available for use by said first player-controlled object; and
(i) initiating transmission of notification data from said first game apparatus through said data transmission link to notify said second game apparatus that said first player-controlled object has completed use of said simulated passageway.

11. A computer readable data storage medium for use with a first game apparatus that communicates through a data transmission link with at least a second game apparatus, said first game apparatus having a first processor that generates picture data that represents a simulated passageway between portions of a simulated 3-dimensional game world populated with at least one player-controlled simulated object for display on a first display device, the data storage medium storing game program instructions comprising;
(a) executable instructions that cause said first processor to initiate transmission of data through said data transmission link to said second game apparatus to cause said second game apparatus to send first status data through said data transmission link to said first game apparatus regarding availability of said simulated passageway for passage of said player-controlled simulated object;
(b) executable instructions that cause said first processor to receive said first status data through said data transmission link from said second game apparatus that indicates that said simulated passageway is unavailable for passage of said player-controlled simulated object;
(c) executable instructions that cause said first processor to store said first status data in said first game apparatus as attribute data having a value of unavailable for said simulated passageway;
(d) executable instructions that cause said first processor to receive second status data through said data transmission link from said second game apparatus that indicates that said simulated passageway is available for passage of said player-controlled simulated object after receipt of said first status data by said first processor;
(e) executable instructions that cause said first processor to change said value of said attribute data from unavailable to available for said simulated passageway in accordance with said second status data;
(f) executable instructions that cause said first processor to generate picture data representing said player-controlled object making use of said simulated passageway after said first processor has determined from said attribute data that said simulated passageway is available for use by said first player-controlled object; and
(g) executable instructions that cause said first processor to initiate transmission of third status data through said data transmission link to notify said second game apparatus that said player-controlled simulated object has completed passage of said simulated passageway.

12. The data storage medium of claim 11, wherein said data storage medium is from the group comprising: an optically coded medium, a semiconductor memory, and a magnetic data storage medium.

13. The data storage medium of claim 11, wherein said data storage medium is a writable data memory into which said game program instructions are downloaded from a separately housed system.

14. The data storage medium of claim 11, wherein said first game apparatus is from the group comprising: video game system, handheld game system, computer, and a combination thereof.

15. The data storage medium of claim 11, wherein said data transmission link comprises one from the group of: a computer, the Internet, a network server, wire transmission, wireless transmission, video game system, and a combination thereof.

* * * * *